United States Patent
Xu et al.

(10) Patent No.: US 10,666,389 B2
(45) Date of Patent: *May 26, 2020

(54) METHOD AND DEVICE FOR POLAR CODE RATE MATCHING

(71) Applicant: HUAWEI TECHNOLOGIES CO., LTD, Shenzhen, Guangdong (CN)

(72) Inventors: Chen Xu, Hangzhou (CN); Gongzheng Zhang, Hangzhou (CN); Rong Li, Hangzhou (CN); Huazi Zhang, Hangzhou (CN); Lingchen Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,197

(22) Filed: May 28, 2019

(65) Prior Publication Data
US 2019/0280814 A1    Sep. 12, 2019

Related U.S. Application Data

(63) Continuation of application No. 16/214,147, filed on Dec. 10, 2018, now Pat. No. 10,341,052, which is a
(Continued)

(30) Foreign Application Priority Data

Mar. 24, 2017    (CN) .......................... 2017 1 0184083

(51) Int. Cl.
*H04L 1/00*    (2006.01)
*H04L 29/08*    (2006.01)
*H04W 72/12*    (2009.01)

(52) U.S. Cl.
CPC .......... *H04L 1/0043* (2013.01); *H04L 1/0068* (2013.01); *H04L 1/0071* (2013.01);
(Continued)

(58) Field of Classification Search
None
See application file for complete search history.

(56) References Cited

U.S. PATENT DOCUMENTS

| | | | |
|---|---|---|---|
| 2016/0285479 A1* | 9/2016 | El-Khamy | ........ H03M 13/6368 |
| 2018/0026663 A1* | 1/2018 | Wu | ..................... H03M 13/155 |
| | | | 714/776 |
| 2018/0199350 A1* | 7/2018 | John Wilson | ......... H04L 1/0041 |

* cited by examiner

*Primary Examiner* — Christine T Duong
(74) *Attorney, Agent, or Firm* — Huawei Technologies Co., Ltd.

(57) ABSTRACT

Embodiments of the application provide a method and device for polar code rate matching in a wireless communication network. A device of the network obtains K information bits. The device generates a to-be-encoded sequence having a length N bits. The to-be-encoded sequence includes the K information bits and L frozen bits. The L frozen bits are placed in L bit positions of the to-be-encoded sequence. The L bit positions are determined according to a rate match manner which is either puncturing or shortening. The device polar encodes the to-be-encoded sequence to obtain the encoded sequence. The device interleaves the encoded sequence to obtain an interleaved sequence and then stores the interleaved sequence into a cyclic cache. The device sequentially outputs M bits of the interleaved sequence from the cyclic cache according to the rate matching manner.

12 Claims, 8 Drawing Sheets

Related U.S. Application Data continuation of application No. PCT/CN2018/079947, filed on Mar. 22, 2018.

(52) U.S. Cl.
CPC ........ *H04L 1/0072* (2013.01); *H04L 67/2842* (2013.01); *H04W 72/1231* (2013.01)

METHOD AND DEVICE FOR POLAR CODE RATE MATCHING

CROSS-REFERENCE TO RELATED APPLICATIONS

This application is a continuation of U.S. patent application Ser. No. 16/214,147, filed on Dec. 10, 2018, which is a continuation of continuation of International Application No. PCT/CN2018/079947, filed on Mar. 22, 2018. The International Application claims priority to Chinese Patent Application No. 201710184083.8, filed on Mar. 24, 2017. All of the aforementioned patent applications are hereby incorporated by reference in their entireties.

TECHNICAL FIELD

Embodiments of this application relate to encoding and decoding technologies, and in particular, to a method and device for polar code rate matching.

BACKGROUND

Channel encoding is used in communication systems to improve data transmission reliability, so as to ensure communication quality. Polar codes, proposed by Professor Arikan of Turkey, are the first kind of codes that are theoretically proven to be able to achieve the Shannon capacity and having low encoding and decoding complexity. Therefore, the polar codes have a great development and application potential in the fifth generation (5G) communication systems, and were accepted for control channel encoding at the 3GPP (3rd Generation Partnership Project) RAN 1 (RAN: Radio Access Network) #87 meeting.

In actual applications, information to be transmitted is encoded at the transmitting end, and received encoded information is decoded at the receiving end. Normally, polar codes have fixed lengths. For improving transmission efficiency, an encoder may need to perform rate matching after encoding, so as to obtain a polar code of any code length through the rate matching. The encoder performs rate matching by using bit repetition, puncturing, or shortening on a transmission channel. However, all the three rate matching manners in the prior art need to be implemented by using respective hardware. When all of the three rate matching manners are used, three different sets of hardware are required. Consequently, hardware implementation complexity is high, and equipment volume is large.

SUMMARY

Embodiments of the present application provides a polar code rate matching method and device, in order to reduce hardware complexity and an area occupied by hardware.

According to a first aspect, embodiments of this application provide method for a polar rate matching, including:

polar encoding, according to a mother code length N and a rate matching manner, to obtain encoded bits, wherein the rate matching manner is a first rate matching manner or a second rate matching manner, and N is a positive integer;

storing, into a cyclic cache according to a bit storage order corresponding to the rate matching manner, the encoded bits obtained after the polar encoding, wherein the first rate matching manner and the second rate matching manner are corresponding to a same bit storage order; and reading, from the cyclic cache according to a bit reading order corresponding to the rate matching manner, an output sequence, wherein the first rate matching manner and the second rate matching manner are corresponding to different bit reading orders.

Because the different rate matching manners are corresponding to the same bit storage order, to ensure that correct output sequences can be output according to in the different rate matching manners after rate matching, the different rate matching manners are corresponding to different bit reading orders, namely, different bit selection orders.

In a possible design, a length of the output sequence is a target code length M, where M is an integer;

a target code length M corresponding to the first rate matching manner is less than the mother code length N; and a target code length M corresponding to the second rate matching manner is greater than the mother code length N.

In a possible design, wherein storing, into a cyclic cache according to a bit storage order corresponding to the rate matching manner, the encoded bits after the polar encoding specifically comprises:

interleaving, according to an interleaving manner corresponding to the rate matching manner, on the encoded bits obtained after the polar encoding, to obtain interleaved bits, wherein the bit storage order of the encoded bits is the same as an order of the interleaved bits; and collecting the interleaved bits, and storing the interleaved bits into the cyclic cache.

By using the interleaving manner, a puncturing bit or a shortening bit may be set in a preset location, to facilitate reading by the encoder.

In a possible design, wherein a bit reading order corresponding to the first rate matching manner is sequentially reading from an $(N-M+1)^{th}$ bit to an $N^{th}$ bit in the cyclic cache; or a bit reading order corresponding to the first rate matching manner is sequentially reading from a first bit to an $M^{th}$ bit in the cyclic cache;

a bit reading order corresponding to the second rate matching manner is sequentially and cyclically reading, starting from any location of the cyclic cache to an $M^{th}$ bit in the cyclic cache in natural order or in reversed order.

In a possible design, a puncturing bit or a shortening bit indicated by the first rate matching manner is in a first set, and a bit reading order corresponding to the first rate matching manner is:

sequentially reading the encoded bits in the cyclic cache in natural order or in reversed order; and when a sequence number corresponding to a current bit is in the first set, skipping the current bit, and continuing with reading until a last bit is read; and a bit reading order corresponding to the second rate matching manner is sequentially and cyclically reading, starting from any location of the cyclic cache to an $M^{th}$ bit in the cyclic cache in natural order or in reversed order.

In a possible design, wherein storing, into a cyclic cache according to a bit storage order corresponding to the rate matching manner, the encoded bits obtained after the polar encoding specifically comprises:

interleaving, according to an interleaving manner corresponding to the rate matching manner, on the encoded bits, to obtain interleaved bits, where the bit storage order corresponding to the rate matching manner is the same as an order of the interleaved bits; and bit collecting on the interleaved bits, and storing the interleaved bits into the cyclic cache, wherein one or more bits are deleted from the interleaved bits by puncturing in the bit collecting or wherein one or more bits are deleted from the interleaved bits by shortening in the bit collecting.

In a possible design, wherein storing, into a cyclic cache according to a bit storage order corresponding to the rate matching manner, the encoded bits obtained after the polar encoding specifically comprises:

bit collecting, according to the bit storage order corresponding to the rate matching manner, on the encoded bits, and storing the encoded bits into the cyclic cache, wherein one or more bits are deleted from the encoded bits by puncturing in the bit collecting or one or more bits are deleted from the encoded bits by shortening in the encoded bits in the bit collecting, the bit storage order corresponding to the rate matching manner is natural order or reversed order, and no interleaver is required for implementation, thereby reducing hardware configurations and hardware complexity.

In a possible design, wherein the bit reading order corresponding to the first rate matching manner is reading, in natural order, from a first bit to a last bit in the cyclic cache, or reading, in reversed order, from a last bit to a first bit in the cyclic cache; and a bit reading order corresponding to the second rate matching manner is sequentially and cyclically reading M bits starting from any location in the cyclic cache in natural order or in reversed order.

In a possible design, wherein the bit storage order comprise at least one or a combination of the following:

the encoded bits are sorted in the cyclic cache in descending order, in ascending order, in descending order after bit reversal, in ascending order after bit reversal, in descending order of reliability, in ascending order of reliability, in random order, in ascending order after offset bit reversal, in descending order after offset bit reversal, or in an order corresponding to bitwise linear interleaving.

In a possible design, wherein the interleaving manner is used to indicate a quantity Rn of rows, a quantity Cn of columns, and row-column interleaving or column-row interleaving, where both Rn and Cn are integer powers of 2, and N=Rn×Cn; and when the interleaving manner is the column-row interleaving, the bit storage order is sorting, by row, encoded bits obtained after bit reversal and column interleaving, where each row of the encoded bits is used as a sub-segment, and the encoded bits obtained after bit reversal and column interleaving are encoded bits that are obtained after bit reversal and column interleaving; and a bit reading order corresponding to the first rate matching manner is sequentially reading one bit from each sub-segment after bit reversal and row interleaving are performed on the encoded bits obtained after bit reversal and column interleaving, until M bits are read; and a bit reading order corresponding to the second rate matching manner is sequentially and cyclically reading, in natural order or in reversed order by row and starting from any location in the encoded bits obtained after bit reversal and column interleaving, the encoded bits in the cyclic cache until M bits are read; or when the interleaving manner is the row-column interleaving, the bit storage order is sorting, by column, encoded bits obtained after bit reversal and row interleaving, where each column of the encoded bits is used as a sub-segment, and the encoded bits obtained after bit reversal and row interleaving are encoded bits that are obtained after bit reversal and row interleaving are performed on the encoded bits obtained after the polar encoding; and a bit reading order corresponding to the first rate matching manner is sequentially reading one bit from each sub-segment after bit reversal and column interleaving are performed on the encoded bits obtained after bit reversal and row interleaving, until M bits are read; and a bit reading order corresponding to the second rate matching manner is sequentially and cyclically reading, in natural order or in reversed order by column and starting from any location in the encoded bits obtained after bit reversal and row interleaving, the encoded bits in the cyclic cache until M bits are read.

A second aspect of the embodiments of this application provides A method for polar code rate matching, comprising:

polar encoding, according to a mother code length N and a rate matching manner, to obtain encoded bits after the polar encoding, where the rate matching manner is one of a first rate matching manner, a second rate matching manner, and a third rate matching manner, and N is a positive integer;

storing, into a cyclic cache according to a bit storage order corresponding to the rate matching manner, the encoded bits, wherein the first rate matching manner, the second rate matching manner, and the third rate matching manner are corresponding to a same bit storage order; and reading, from the cyclic cache according to a bit reading order corresponding to the rate matching manner, an output sequence obtained after rate matching, where at least two of the first rate matching manner, the second rate matching manner, and the third rate matching manner are corresponding to different bit reading orders.

Because the different rate matching manners are corresponding to the same bit storage order, to ensure that correct output sequences can be output according to in the different rate matching manners after rate matching, the different rate matching manners are corresponding to different bit reading orders, namely, different bit selection orders.

In a possible design, a length of the output sequence is a target code length M, where M is an integer;

a target code length M corresponding to the first rate matching manner is less than the mother code length N;

a target code length M corresponding to the second rate matching manner is less than the mother code length N; and a target code length M corresponding to the third rate matching manner is greater than the mother code length N.

In a possible design, wherein the first rate matching manner, the second rate matching manner, and the third rate matching manner are corresponding to different bit reading orders.

In a possible design, wherein storing, into a cyclic cache according to a bit storage order corresponding to the rate matching manner, the encoded bits after the polar encoding specifically comprises:

interleaving, according to an interleaving manner corresponding to the rate matching manner, on the encoded bits obtained after the polar encoding, to obtain interleaved bits, wherein the bit storage order of the encoded bits is the same as an order of the interleaved bits; and collecting, the interleaved bits, and storing the interleaved bits into the cyclic cache.

In a possible design, wherein the bit storage order comprises: a first storage order and a second storage order, where the first rate matching manner is used to indicate the first storage order in advance, and the second rate matching manner is used to indicate the second storage order in advance; and wherein the first storage order is used to indicate a storage order, in the cyclic cache, of first N/2 bits of the encoded bits, and the second storage order is used to indicate a storage order, in the cyclic cache, of last N/2 bits of the encoded bits; or wherein the first storage order is used to indicate a storage order, in the cyclic cache, of last N/2 bits of the encoded bits, and the second storage order is used to indicate a storage order, in the cyclic cache, of first N/2 bits of the encoded bits.

In a possible design, wherein the first storage order comprises at least one or a combination of the following:

a descending order, an ascending order, a descending order of reliability, an ascending order of reliability, a random order, an order corresponding to bitwise linear interleaving, and a reversed order of an order corresponding to bitwise linear interleaving; and wherein the second storage order comprises at least one or a combination of the following:

a descending order, an ascending order, a descending order after bit reversal, an ascending order after bit reversal, a descending order of reliability, an ascending order of reliability, a random order, an ascending order after offset bit reversal, a descending order after offset bit reversal, an order corresponding to bitwise linear interleaving, and a reversed order of an order corresponding to bitwise linear interleaving.

In a possible design, when the first storage order is used to indicate the storage order, in the cyclic cache, of the first N/2 bits of the encoded bits, and the second storage order is used to indicate the storage order, in the cyclic cache, of the last N/2 bits of the encoded bits, a bit reading order corresponding to the first rate matching manner is sequentially reading from an $(N-M+1)^{th}$ bit to an $N^{th}$ bit in the cyclic cache, and a bit reading order corresponding to the second rate matching manner is sequentially reading from a first bit to an $M^{th}$ bit in the cyclic cache; or when the first storage order is used to indicate the storage order, in the cyclic cache, of the last N/2 bits of the encoded bits obtained after the polar encoding, and the second storage order is used to indicate the storage order, in the cyclic cache, of the first N/2 bits of the encoded bits, a bit reading order corresponding to the first rate matching manner is sequentially reading from a first bit to an $M^{th}$ bit in the cyclic cache, and a bit reading order corresponding to the second rate matching manner is sequentially reading an $(N-M+1)^{th}$ bit to an $N^{th}$ bit in the cyclic cache; and a bit reading order corresponding to the third rate matching manner is sequentially and cyclically reading, starting from any location and in natural order or in reversed order, the encoded bits in the cyclic cache until M bits are read.

In a possible design, a sequence number of a puncturing bit in the first rate matching manner is in a first set, and a sequence number of a shortening bit in the second rate matching manner is in a second set;

a bit reading order corresponding to the first rate matching manner is:

sequentially reading the cyclic cache in natural order or in reversed order; and when a sequence number corresponding to a current bit is in the first set, skipping the current bit, and continuing with reading until a last bit is read;

a bit reading order corresponding to the second rate matching manner is: sequentially reading the cyclic cache in natural order or in reversed order; and when a sequence number corresponding to a current bit is in the second set, skipping the current bit, and continuing with reading until a last bit is read; and a bit reading order corresponding to the third rate matching manner is sequentially and cyclically reading, starting from any location and in natural order or in reversed order, the encoded bits in the cyclic cache until M bits are read.

In a possible design, wherein the first rate matching manner and the second rate matching manner are corresponding to a same bit reading order, and wherein the first rate matching manner and the third rate matching manner are corresponding to different bit reading orders.

In a possible design, wherein the storing, into a cyclic cache according to a bit storage order corresponding to the rate matching manner, the encoded bits comprises:

interleaving, according to an interleaving manner corresponding to the rate matching manner, on the encoded bits, to obtain interleaved bits, wherein the bit storage order is the same as an order of the interleaved bits; and bit collecting on the interleaved bits, and storing the interleaved bits into the cyclic cache, wherein one or more bits are deleted from the interleaved bits by puncturing in the bit collecting or wherein one or more bits are deleted from the interleaved bits by shortening in the bit collecting.

In a possible design, wherein the storing, into a cyclic cache according to a bit storage order corresponding to the rate matching manner, the encoded bits comprises:

bit collecting, according to the bit storage order corresponding to the rate matching manner, on the encoded bits, and storing the encoded bits into the cyclic cache, wherein one or more bits are deleted from the encoded bits by puncturing in the bit collecting or one or more bits are deleted from the encoded bits by shortening in the encoded bits in the bit collecting, the bit storage order corresponding to the rate matching manner is natural order or reversed order.

In a possible design, wherein the bit reading order corresponding to the first rate matching manner is reading, in natural order, from a first bit to a last bit in the cyclic cache, or reading, in reversed order, from a last bit to a first bit in the cyclic cache; and a bit reading order corresponding to the third rate matching manner is sequentially and cyclically reading M bits, starting from any location in the cyclic cache in natural order or in reversed order.

A third aspect of the embodiments of this application provides a device for polar code rate matching, including:

an encoding module, configured to polar encode according to a mother code length N and a rate matching manner to obtain encoded bits, wherein the rate matching manner is a first rate matching manner or a second rate matching manner, and N is a positive integer;

a storage module, configured to store, into a cyclic cache according to a bit storage order corresponding to the rate matching manner, the encoded bits obtained after the polar encoding, wherein the first rate matching manner and the second rate matching manner are corresponding to a same bit storage order; and a reading module, configured to read, from the cyclic cache according to a bit reading order corresponding to the rate matching manner, an output sequence, wherein the first rate matching manner and the second rate matching manner are corresponding to different bit reading orders.

In a possible design, a length of the output sequence is a target code length M, where M is an integer;

a target code length M corresponding to the first rate matching manner is less than the mother code length N; and a target code length M corresponding to the second rate matching manner is greater than the mother code length N.

In a possible design, wherein the storage module is configured to interleave according to an interleaving manner corresponding to the rate matching manner, on the encoded bits obtained after the polar encoding, to obtain interleaved bits, wherein the bit storage order of the encoded bits is the same as an order of the interleaved bits; and collect the interleaved bits, and storing the interleaved bits into the cyclic cache.

In a possible design, wherein a bit reading order corresponding to the first rate matching manner is sequentially reading from an $(N-M+1)^{th}$ bit to an $N^{th}$ bit in the cyclic cache; or a bit reading order corresponding to the first rate matching manner is sequentially reading from a first bit to an $M^{th}$ bit in the cyclic cache;

a bit reading order corresponding to the second rate matching manner is sequentially and cyclically reading, starting from any location of the cyclic cache to an $M^{th}$ bit in the cyclic cache in natural order or in reversed order.

In a possible design, a puncturing bit or a shortening bit indicated by the first rate matching manner is in a first set, and a bit reading order corresponding to the first rate matching manner is:

sequentially reading the encoded bits in the cyclic cache in natural order or in reversed order; and when a sequence number corresponding to a current bit is in the first set, skipping the current bit, and continuing with reading until a last bit is read; and a bit reading order corresponding to the second rate matching manner is sequentially and cyclically reading, starting from any location of the cyclic cache to an $M^{th}$ bit in the cyclic cache in natural order or in reversed order.

In a possible design, the storage module is specifically configured to:

interleave, according to an interleaving manner corresponding to the rate matching manner, on the encoded bits, to obtain interleaved bits, where the bit storage order corresponding to the rate matching manner is the same as an order of the interleaved bits; and bit collect on the interleaved bits, and store the interleaved bits into the cyclic cache, wherein one or more bits are deleted from the interleaved bits by puncturing in the bit collecting or wherein one or more bits are deleted from the interleaved bits by shortening in the bit collecting.

In a possible design, wherein the storage module is specifically configured to: bit collect, according to the bit storage order corresponding to the rate matching manner, on the encoded bits, and store the encoded bits into the cyclic cache, wherein one or more bits are deleted from the encoded bits by puncturing in the bit collecting or one or more bits are deleted from the encoded bits by shortening in the encoded bits in the bit collecting, the bit storage order corresponding to the rate matching manner is natural order or reversed order.

In a possible design, wherein the bit reading order corresponding to the first rate matching manner is reading, in natural order, from a first bit to a last bit in the cyclic cache, or reading, in reversed order, from a last bit to a first bit in the cyclic cache; and a bit reading order corresponding to the second rate matching manner is sequentially and cyclically reading M bits starting from any location in the cyclic cache in natural order or in reversed order.

In a possible design, wherein the bit storage order comprise at least one or a combination of the following:

the encoded bits are sorted in the cyclic cache in descending order, in ascending order, in descending order after bit reversal, in ascending order after bit reversal, in descending order of reliability, in ascending order of reliability, in random order, in ascending order after offset bit reversal, in descending order after offset bit reversal, or in an order corresponding to bitwise linear interleaving.

In a possible design, wherein the interleaving manner is used to indicate a quantity Rn of rows, a quantity Cn of columns, and row-column interleaving or column-row interleaving, where both Rn and Cn are integer powers of 2, and $N=Rn \times Cn$; and when the interleaving manner is the column-row interleaving, the bit storage order is sorting, by row, encoded bits obtained after bit reversal and column interleaving, where each row of the encoded bits is used as a sub-segment, and the encoded bits obtained after bit reversal and column interleaving are encoded bits that are obtained after bit reversal and column interleaving;

a bit reading order corresponding to the first rate matching manner is sequentially reading one bit from each sub-segment after bit reversal and row interleaving are performed on the encoded bits obtained after bit reversal and column interleaving, until M bits are read; and a bit reading order corresponding to the second rate matching manner is sequentially and cyclically reading, in natural order or in reversed order by row and starting from any location in the encoded bits obtained after bit reversal and column interleaving, the encoded bits in the cyclic cache until M bits are read; or when the interleaving manner is the row-column interleaving, the bit storage order is sorting, by column, encoded bits obtained after bit reversal and row interleaving, where each column of the encoded bits is used as a sub-segment, and the encoded bits obtained after bit reversal and row interleaving are encoded bits that are obtained after bit reversal and row interleaving are performed on the encoded bits obtained after the polar encoding; and a bit reading order corresponding to the first rate matching manner is sequentially reading one bit from each sub-segment after bit reversal and column interleaving are performed on the encoded bits obtained after bit reversal and row interleaving, until M bits are read; and a bit reading order corresponding to the second rate matching manner is sequentially and cyclically reading, in natural order or in reversed order by column and starting from any location in the encoded bits obtained after bit reversal and row interleaving, the encoded bits in the cyclic cache until M bits are read.

A fourth aspect of the embodiments of this application provides a device for polar code rate matching, including:

an encoding module, configured to polar encode according to a mother code length N and a rate matching manner, to obtain encoded bits after the polar encoding, where the rate matching manner is one of a first rate matching manner, a second rate matching manner, and a third rate matching manner, and N is a positive integer;

a storage module, configured to store, into a cyclic cache according to a bit storage order corresponding to the rate matching manner, the encoded bits, wherein the first rate matching manner, the second rate matching manner, and the third rate matching manner are corresponding to a same bit storage order; and a reading module, configured to read, from the cyclic cache according to a bit reading order corresponding to the rate matching manner, an output sequence obtained after rate matching, where at least two of the first rate matching manner, the second rate matching manner, and the third rate matching manner are corresponding to different bit reading orders.

In a possible design, a length of the output sequence is a target code length M, where M is an integer;

a target code length M corresponding to the first rate matching manner is less than the mother code length N;

a target code length M corresponding to the second rate matching manner is less than the mother code length N; and a target code length M corresponding to the third rate matching manner is greater than the mother code length N.

In a possible design, wherein the first rate matching manner, the second rate matching manner, and the third rate matching manner are corresponding to different bit reading orders.

In a possible design, wherein the storage module is specifically configured to:

interleave, according to an interleaving manner corresponding to the rate matching manner, on the encoded bits obtained after the polar encoding, to obtain interleaved bits, wherein the bit storage order of the encoded bits is the same as an order of the interleaved bits; and collect the interleaved bits, and storing the interleaved bits into the cyclic cache.

In a possible design, wherein the bit storage order comprises: a first storage order and a second storage order, where the first rate matching manner is used to indicate the first storage order in advance, and the second rate matching manner is used to indicate the second storage order in advance; and wherein the first storage order is used to indicate a storage order, in the cyclic cache, of first N/2 bits of the encoded bits, and the second storage order is used to indicate a storage order, in the cyclic cache, of last N/2 bits of the encoded bits; or wherein the first storage order is used to indicate a storage order, in the cyclic cache, of last N/2 bits of the encoded bits, and the second storage order is used to indicate a storage order, in the cyclic cache, of first N/2 bits of the encoded bits.

In a possible design, wherein the first storage order comprises at least one or a combination of the following:

a descending order, an ascending order, a descending order of reliability, an ascending order of reliability, a random order, an order corresponding to bitwise linear interleaving, and a reversed order of an order corresponding to bitwise linear interleaving; and wherein the second storage order comprises at least one or a combination of the following:

a descending order, an ascending order, a descending order after bit reversal, an ascending order after bit reversal, a descending order of reliability, an ascending order of reliability, a random order, an ascending order after offset bit reversal, a descending order after offset bit reversal, an order corresponding to bitwise linear interleaving, and a reversed order of an order corresponding to bitwise linear interleaving.

In a possible design, when the first storage order is used to indicate the storage order, in the cyclic cache, of the first N/2 bits of the encoded bits, and the second storage order is used to indicate the storage order, in the cyclic cache, of the last N/2 bits of the encoded bits, a bit reading order corresponding to the first rate matching manner is sequentially reading from an $(N-M+1)^{th}$ bit to an $N^{th}$ bit in the cyclic cache, and a bit reading order corresponding to the second rate matching manner is sequentially reading from a first bit to an $M^{th}$ bit in the cyclic cache; or when the first storage order is used to indicate the storage order, in the cyclic cache, of the last N/2 bits of the encoded bits obtained after the polar encoding, and the second storage order is used to indicate the storage order, in the cyclic cache, of the first N/2 bits of the encoded bits, a bit reading order corresponding to the first rate matching manner is sequentially reading from a first bit to an $M^{th}$ bit in the cyclic cache, and a bit reading order corresponding to the second rate matching manner is sequentially reading an $(N-M+1)^{th}$ bit to an $N^{th}$ bit in the cyclic cache; and a bit reading order corresponding to the third rate matching manner is sequentially and cyclically reading, starting from any location and in natural order or in reversed order, the encoded bits in the cyclic cache until M bits are read.

In a possible design, a sequence number of a puncturing bit in the first rate matching manner is in a first set, and a sequence number of a shortening bit in the second rate matching manner is in a second set;

a bit reading order corresponding to the first rate matching manner is: sequentially reading the cyclic cache in natural order or in reversed order; and when a sequence number corresponding to a current bit is in the first set, skipping the current bit, and continuing with reading until a last bit is read;

a bit reading order corresponding to the second rate matching manner is: sequentially reading the cyclic cache in natural order or in reversed order; and when a sequence number corresponding to a current bit is in the second set, skipping the current bit, and continuing with reading until a last bit is read; and a bit reading order corresponding to the third rate matching manner is sequentially and cyclically reading, starting from any location and in natural order or in reversed order, the encoded bits in the cyclic cache until M bits are read.

In a possible design, wherein the first rate matching manner and the second rate matching manner are corresponding to a same bit reading order, and wherein the first rate matching manner and the third rate matching manner are corresponding to different bit reading orders.

In a possible design, wherein the storage module is specifically configured to: interleave, according to an interleaving manner corresponding to the rate matching manner, on the encoded bits, to obtain interleaved bits, wherein the bit storage order is the same as an order of the interleaved bits; and bit collect on the interleaved bits, and storing the interleaved bits into the cyclic cache, wherein one or more bits are deleted from the interleaved bits by puncturing in the bit collecting or wherein one or more bits are deleted from the interleaved bits by shortening in the bit collecting.

In a possible design, wherein the storage module is specifically configured to:

bit collect, according to the bit storage order corresponding to the rate matching manner, on the encoded bits, and storing the encoded bits into the cyclic cache, wherein one or more bits are deleted from the encoded bits by puncturing in the bit collecting or one or more bits are deleted from the encoded bits by shortening in the encoded bits in the bit collecting, the bit storage order corresponding to the rate matching manner is natural order or reversed order.

In a possible design, wherein the bit reading order corresponding to the first rate matching manner is reading, in natural order, from a first bit to a last bit in the cyclic cache, or reading, in reversed order, from a last bit to a first bit in the cyclic cache; and a bit reading order corresponding to the third rate matching manner is sequentially and cyclically reading M bits, starting from any location in the cyclic cache in natural order or in reversed order.

A fifth aspect of the embodiments of this application device for polar code rate matching, including a memory and a processor. The memory is configured to store a program. The processor is configured to execute the program stored in the memory. When the program is executed, the processor is configured to perform the method according to any one of the first aspect and various implementations of the first aspect, or the processor is configured to perform the method according to any one of the second aspect and various implementations of the second aspect.

A sixth aspect of the embodiments of this application provides a computer-readable storage medium, including an instruction. When running on a computer, the instruction enables the computer to perform the method according to any one of the first aspect and various implementations of the first aspect, or enables the computer to perform the method according to any one of the second aspect and various implementations of the second aspect.

A seventh aspect of the embodiments of this application provides a computer program product. The computer program product includes computer program code. When running on a computer, the computer program code enables the computer to perform the method according to any one of the first aspect and various implementations of the first aspect, or enables the computer to perform the method according to any one of the second aspect and various implementations of the second aspect.

An eighth aspect of the embodiments of this application provides a chip, including a memory and a processor. The memory is configured to store a computer program. The processor is configured to invoke, from the memory, and run the computer program, so that the processor performs the method according to any one of the first aspect and various implementations of the first aspect, or the processor performs the method according to any one of the second aspect and various implementations of the second aspect.

The embodiments of this application provide method and device for the polar code rate matching. According to the method, the polar encoding is performed according to the mother code length N and the rate matching manner, to obtain the encoded bits after the polar encoding. The rate matching manner is the first rate matching manner or the second rate matching manner. The encoded bits are stored into the cyclic cache according to the bit storage order corresponding to the rate matching manner. The first rate matching manner and the second rate matching manner are corresponding to the same bit storage order, so that the first rate matching manner and the second rate matching manner are corresponding to the same interleaving manner. One interleaver can be used to implement the two rate matching manners. When storage is performed in natural order or in reversed order, the storage may be directly performed without an interleaver, thereby reducing the hardware complexity and the area occupied by the hardware. The output sequence obtained after rate matching is read from the cyclic cache according to the bit reading order corresponding to the rate matching manner. The first rate matching manner and the second rate matching manner are corresponding to different bit reading orders, so that different outputs are implemented for different rate matching manners, and it is ensured that the encoder can output a correct output sequence to a decoder.

DESCRIPTION OF EMBODIMENTS

A network architecture and a service scenario that are described in the embodiments of this application are intended to illustrate technical solutions of the embodiments of this application more clearly, and constitute no limitation on the technical solutions provided in the embodiments of this application. With evolution of the network architecture and emergence of new service scenarios, the technical solutions provided in the embodiments of this application are also applicable to similar technical problems.

Figure 1:
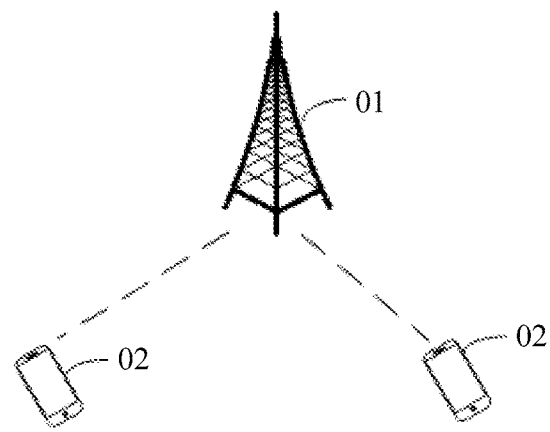
FIG. 1 shows a basic network architecture in which embodiments of this application may be applied.

The embodiments of this application may be applied to a scenario in which polar encoding is performed on information bits, and may be applied to Wi-Fi, fourth generation (4G), fifth generation (5G), and future communications systems. FIG. 1 shows a basic network architecture in which embodiments of this application may be applied. As shown in FIG. 1, the network architecture includes a network device 01 and one or more terminals 02. The terminal, as referred to in the description of this application, may include various devices with a wireless communication function, such as handheld devices, in-vehicle devices, wearable devices, computing devices, other processing devices connected to wireless modems, and terminal devices, mobile stations, and the like that are in various forms. The network device, as referred to in the description of this application, is a device that is deployed on a radio access network and that is configured to provide a wireless communication function for the terminal. The network device may be, for example, a base station as shown in FIG. 1. The base station may include macro base station, micro base station, relay station, access point, and the like in various forms. A method provided in the embodiments of this application may also be applied to other network devices that require encoding, and the type of the network device is not limited.

In actual applications, information to be transmitted is encoded at the transmitting end, and received encoded information is decoded at the receiving end. For improving transmission efficiency, an encoder may need to perform rate matching after encoding, so as to obtain a polar code of any code length through the rate matching. Correspondingly, a decoder needs to perform de-rate matching and decoding.

When the network device is the encoder, the corresponding terminal is the decoder; or when the terminal is the encoder, the corresponding network device is the decoder.

For ease of understanding, the following introduces target code length and mother code length in polar encoding process.

Target code length is a length of an output sequence for transmission. The output sequence for transmission is obtained by performing rate matching on an encoded sequence, and the encoded sequence is obtained by performing polar encoding on information bits. The target code length M is determined according to at least one of a quantity K of the information bits, a bit rate R, an allocated resource, and channel quality. For example, M=INT(K/R), where INT(•) indicates rounding. In this embodiment, a specific manner of determining the target code length M is not particularly limited.

A mother code is a binary row vector. Some bits of the mother code are used to carry the information bits. Other bits are set to a fixed value pre-agreed on between the encoder and the decoder, and are referred to as frozen bits. The value of the frozen bits may be set randomly, and are usually set to 0. The mother code length N may be determined according to the target code length M. For example, $N=\min(2^n, N_{max})$, where n is a minimum integer that is greater than or equal to $\log_2 M$. For example, $N=\min(2^{\lceil \log_2 M \rceil}, N_{max})$, where $\min(\cdot)$ indicates taking a minimum value, $N_{max}$ is a maximum mother code length supported by a system, and $\lceil \cdot \rceil$ indicates rounding up. The above merely provides a possible implementation example, and the mother code length N may alternatively be determined by other manners.

The following describes three rate matching manners.

(1) Puncturing: Puncturing-based reconstruction, represented by quasi-uniform puncture (QUP), is one of encoding and rate matching manners for obtaining a polar coded sequence of any code length. Specifically, it is first determined that the mother code length is an integer power of 2 that is greater than or equal to the target code length, and then a puncturing location is determined according to the mother code length and the target code length. A channel capacity corresponding to a location of a punctured bit is set to 0 (or an error probability is set to 1, or a signal-to-noise ratio (SNR) is set to be infinitely small). Reliabilities of polar channels are calculated by using methods such as density evolution, Gaussian approximation, or linear fitting, and the reliabilities are sorted, to determine locations of information bits and frozen bits. During transmission, the encoder deletes encoded bits in predetermined puncturing locations, to obtain a rate-matched polar code sequence. During decoding, the bits corresponding to the predetermined puncturing locations are treated as unknown bits, and a corresponding log-likelihood ratio (LLR) is set to 0, and is used to restore the mother code length together with a received LLR of non-puncturing locations, to implement de-rate matching. Then decoding is performed.

(2) Shortening: Similar to that in puncturing, it is determined that the mother code length is an integer power of 2 that is greater than or equal to the target code length. A difference lies in that an encoded bit in a shortening location is related only to a frozen bit, the bit in the shortening location is used as a known bit during decoding, and a corresponding LLR is set to be infinitely large. First, reliabilities of polar channels are calculated according to the mother code. Then, shortening locations are determined, and frozen bits are placed in corresponding polar channels. Finally, locations of information bits and the frozen bits are determined in remaining polar channels according to the reliabilities. During transmission, encoded bits in predetermined shortening locations are deleted, to obtain a rate-matched polar code sequence. During decoding, the shortened bits are treated as known bits, and an LLR is set to be infinitely large, and is used to restore the mother code length together with a received LLR of non-shortened locations, to implement de-rate matching. Then decoding is performed.

(3) Repetition: To balance encoding performance and complexity, a maximum value of the mother code length (an integer power of 2) may be set. Repetition is performed on a polar code obtained after encoding according to the maximum mother code length, to obtain a target code length greater than the maximum mother code length and implement polar code rate matching. Different from that in puncturing and shortening, in repetition, bits that have been encoded into the maximum mother code length are repeatedly sent in a particular order, until the target code length is reached, thereby implementing a rate matching process. At the decoder, LLRs of a same encoding location are combined to implement de-rate matching, and decoding is performed according to the maximum mother code length.

Embodiment of this application provide a polar code rate matching method, in order to resolve a technical problem that three sets of hardware are required for the three rate matching manners. To be specific, in the current technology solutions, three interleavers are required for respectively performing interleaving by using interleavers corresponding to the three rate matching manners, and consequently, hardware implementation complexity is high, and a large area is occupied.

Figure 2:
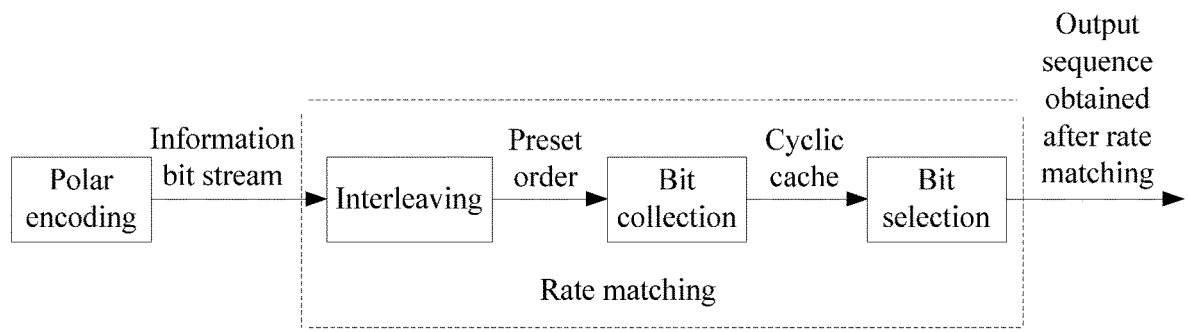
FIG. 2 is a flowchart of a polar code rate matching process according to an embodiment of this application.

FIG. 2 is a flowchart of a polar code rate matching process according to an embodiment of this application. A rate matching manner is selected according to an encoding parameter. Polar encoding is performed, and an information bit stream is output. The information bit stream is interleaved by using an interleaver, so that the information bit stream is sorted in a preset order. Bit collection is performed on an information bit stream in the preset order, and the information bit stream is sent to a cyclic cache. A bit selection method corresponding to the rate matching manner is selected, to obtain an output sequence after rate matching. According to the embodiment of FIG. 2, in the following embodiments, an encoder simultaneously supports two or three rate matching manners, and only one interleaver is required for implementation. The following describes, by using detailed embodiments, a cyclic cache-based hybrid polar code rate matching method provided in the embodiments of this application.

Figure 3:
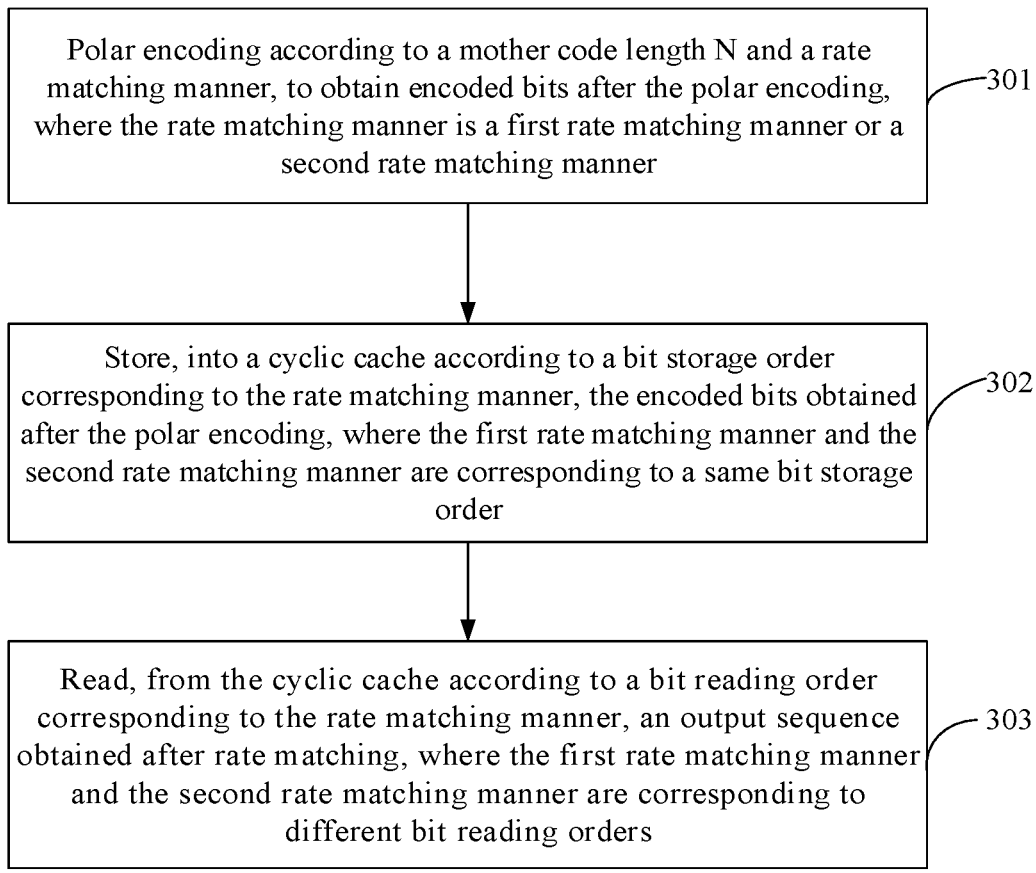
FIG. 3 is a flowchart of a polar code rate matching method according to an embodiment of this application.

FIG. 3 is a flowchart of a polar code rate matching method according to an embodiment of this application. The method provided in this embodiment is applicable to the foregoing process of performing rate matching by the encoder. In this embodiment, an encoder supports two rate matching manners. For example, the two rate matching manners may be shortening and repetition, or may be puncturing and repetition. Shortening and puncturing may be used as one implementation, referred to as puncturing, shortening, or others. The method provided in this embodiment includes the following steps.

Step 301: Polar encoding according to a mother code length N and a rate matching manner, to obtain encoded bits after the polar encoding, where the rate matching manner is a first rate matching manner or a second rate matching manner.

In this embodiment, the first rate matching manner may be the puncturing or shortening, and the second rate matching manner may be the repetition.

When a target code length M is less than the mother code length N, the encoder may select the first rate matching manner. Whether the first rate matching manner is specifically shortening or puncturing may be determined according to a bit rate. Specifically, a correspondence between the bit rate and shortening or puncturing may be pre-specified by using a protocol.

When a target code length M is greater than the mother code length N, the encoder selects the second rate matching manner.

In one encoding process, the encoder selects one rate matching manner for rate matching. After the rate matching manner is selected, polar encoding is performed according to the mother code length N and the selected rate matching manner. For a manner of determining the mother code length, refer to the foregoing description.

Specifically, a polar code is constructed according to the mother code length N, a quantity K of information bits, and the selected rate matching manner. Encoding is performed according to the constructed polar code, to obtain an encoded bit sequence with a length of N. Herein, the polar code includes but is not limited to an Arikan polar code, a PC-polar code, a CA-polar code, and a PC-CA-polar code. The Arikan polar code is a raw polar code that is not concatenated with other codes and that includes only information bits and frozen bits. The PC-polar code is a polar code concatenated with parity check (PC). The CA-polar code is a polar code concatenated with CRC or another concatenated polar code. The PC-CA-polar code is a polar code concatenated with both PC and cyclic redundancy check (CRC). The PC-polar code and the CA-polar code improve polar code performance by concatenating different codes.

In constructing the polar code, if the rate-matching manner is puncturing, the polar code is constructed according to puncturing locations, or if the rate-matching manner is shortening, the polar code is constructed according to shortening locations. Optionally, the polar code may be constructed with reference to an interleaving manner, so that puncturing locations or shortening locations that are obtained after interleaving processing are preset locations.

Step 302: Store, into a cyclic cache according to a bit storage order corresponding to the rate matching manner, the encoded bits, where the first rate matching manner and the second rate matching manner are corresponding to a same bit storage order.

Step 303: Read, from the cyclic cache according to a bit reading order corresponding to the rate matching manner, an output sequence, where the first rate matching manner and the second rate matching manner are corresponding to different bit reading orders.

In this embodiment, the first rate matching manner and the second rate matching manner are corresponding to a same bit storage order, and the bit storage order is determined according to an interleaving manner of an interleaver. Therefore, the first rate matching manner and the second rate matching manner are corresponding to a same interleaving manner, and the first rate matching manner and the second rate matching manner in this embodiment can be implemented by using only one interleaver, without a need of a plurality of interleavers. In other words, the interleaving manner and the bit storage order are the same regardless of whether the encoder selects the first rate matching manner or the second rate matching manner. When the bit storage order is in natural order or in reversed order, the bit storage order can be directly implemented without using an interleaver.

Because the first rate matching manner and the second rate matching manner are corresponding to the same bit storage order, to implement different outputs for different rate matching manners, the first rate matching manner and the second rate matching manner in this embodiment are corresponding to different bit reading orders. To be specific, an output sequence obtained after rate matching is read from the cyclic cache according to a bit reading order corresponding to a selected rate matching manner. A process of reading, from the cyclic cache, the output sequence obtained after rate matching is the bit selection process shown in FIG. 2. The bit reading order may be understood as a bit selection order.

The bit storage order and the bit reading order in this embodiment may be implemented in the following possible implementations.

In a first implementation, interleaving processing is first performed on the encoded bits, to obtain interleaved bits. A bit collection is performed, and the interleaved bits are stored into a cyclic cache. Then, a bit selection is performed. If, in the interleaving process, puncturing bits are placed in the beginning of the interleaved bits, then in the puncturing, last M bits are read in the bit selection process. If, in the interleaving process, shortening bits are placed in the end of the interleaved bits, first M bits are read in the bit selection process. In the repetition, M bits are cyclically read, starting from any location.

Specifically, when the first rate matching manner is the puncturing, a corresponding bit reading order is sequentially reading from an $(N-M+1)^{th}$ bit to an $N^{th}$ bit in the cyclic cache, wherein a first bit to an $(N-M)^{th}$ bit are corresponding to the puncturing locations. Alternatively, when the first rate matching manner is the shortening, a corresponding bit reading order is sequentially reading from a first bit to an $M^{th}$ bit in the cyclic cache, where an $(M+1)^{th}$ bit to an $N^{th}$ bit are corresponding to the shortening locations.

The second rate matching manner is the repetition, and a corresponding bit reading order is sequentially and cyclically reading, M bits starting from any location and in natural order or in reversed order. The any location may be determined according to an encoding parameter, or may be a fixed value, for example, an $(N/4+1)^{th}$ bit. For reading in natural order, each time an $N^{th}$ bit is read, reading cyclically starts from a first bit, until M bits are read. For the reversed order, each time a first bit is read, reading cyclically starts from an $N^{th}$ bit, until M bits are read.

In a second implementation, interleaving is first performed on the encoded bits, to obtain interleaved bits; then bit collection is performed, and the encoded bits are stored into the cyclic cache; and then bit selection is performed. In this embodiment, in an interleaving process, a puncturing bit or a shortening bit may be set in any location. To improve interleaving efficiency, interleaving may be performed in natural order or in reversed order. In a bit selection process, the puncturing bit or the shortening bit only needs to be skipped. In this implementation, the interleaving implementation may alternatively not be used; instead, a manner of performing storage in natural order or in reversed order may be used for implementation.

Specifically, a puncturing bit or a shortening bit in the first rate matching manner is in a first set. In a bit selection process, a bit reading order corresponding to the first rate matching manner is: sequentially reading the cyclic cache in natural order or in reversed order; and when a sequence number corresponding to a current bit is in the first set, skipping the current bit, and continuing with reading until a last bit is read. A bit reading order corresponding to the second rate matching manner is sequentially and cyclically reading M bits starting from any location of the cyclic cache in natural order or in reversed order.

In a third implementation, interleaving processing is first performed on the encoded bits, to obtain interleaved bits; and then bit collection is performed, and the interleaved bits are stored into the cyclic cache. In this embodiment, in an interleaving process, a puncturing bit or a shortening bit may be set in any location. To improve interleaving efficiency, interleaving may be performed in natural order or in reversed order. In a bit collection process, the puncturing bit or the shortening bit is deleted, and all stored content is sequentially read. If there is no puncturing bit or shortening bit, no deletion operation needs to be performed. In this implementation, the interleaving implementation may alternatively not be used; instead, a manner of performing storage in natural order or in reversed order may be used for implementation.

Specifically, when the first rate matching manner is the shortening or puncturing, a corresponding bit reading order is reading, starting from a first bit in the cyclic cache, M bits in natural order, or reading, starting from a last bit in the cyclic cache, M bits in reversed order. Because the puncturing bit or the shortening bit has been deleted, M bits can be read either in natural order or in reversed order.

When the second rate matching manner is the repetition, no bit needs to be deleted, and a corresponding bit reading order is sequentially and cyclically reading, M bits starting from any location of the cyclic cache in natural order or in reversed order in the cyclic cache.

In the foregoing implementations, the interleaving manner is used to indicate a processing process of the interleaver, so that an order of the interleaved bits is a preset order, namely, the bit storage order. In this embodiment, the bit storage order of the encoded bits in the cyclic cache includes at least one or a combination of the following:

in descending order,
in ascending order,
in descending order after bit reversal,
in ascending order after bit reversal,
in descending order of reliability,
in ascending order of reliability,
in random order,
in ascending order after offset bit reversal,
in descending order after offset bit reversal, and
in an order corresponding to bitwise linear interleaving.

The reliability is reliability of polar channels corresponding to the polar code, and corresponding encoded bits are sorted similarly. A reliability measurement parameter used to represent the reliability may be a polarization weight (PW) value, a Bhattacharya parameter, an error probability, a channel capacity, or the like. Bit reversal is: converting a decimal integer into a binary form, reversing an order of binary elements, and converting a binary number obtained after the reversing into a decimal number. The obtained new number is a bit reversal value of the original number. An order combination is a combination of the foregoing orders. For example, a first bit to an $(N/2)^{th}$ bit are in any one of the foregoing orders, and an $(N/2+1)^{th}$ bit to an $N^{th}$ bit are in ascending order after bit reversal.

According to the polar code rate matching method provided in this embodiment, the encoder performs polar encoding according to the mother code length N and the rate matching manner, to obtain the encoded bits after the polar encoding, where the rate matching manner is the first rate matching manner or the second rate matching manner. The encoded bits obtained after the polar encoding are stored into the cyclic cache according to the bit storage order corresponding to the rate matching manner. The first rate matching manner and the second rate matching manner are corresponding to the same bit storage order, so that the first rate matching manner and the second rate matching manner are corresponding to the same interleaving manner. One interleaver can be used to implement the two rate matching manners, or when storage is performed in natural order or in reversed order, the storage may be directly performed without an interleaver, thereby reducing hardware complexity and an area occupied by hardware. The encoder reads, from the cyclic cache according to the bit reading order corresponding to the rate matching manner, the output sequence obtained after rate matching. The first rate matching manner and the second rate matching manner are corresponding to different bit reading orders, so that different outputs are implemented for different rate matching manners, and it is ensured that the encoder can output a correct output sequence to a decoder.

The following describes several examples. In the following embodiments, the bit storage order and the bit reading order are described in detail. For other processes, refer to the foregoing embodiment. Details are not described herein again in the embodiments.

Figure 4:
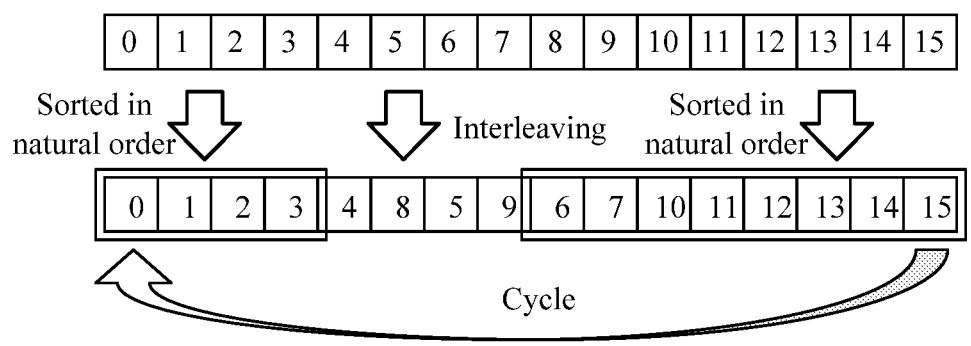
FIG. 4 is a schematic diagram of a bit storage order according to an embodiment of this application.

In a specific example, the first rate matching manner is the puncturing, and the second rate matching manner is the repetition. The bit storage order, in the cycle cache, of the encoded bits is that first N/4 encoded bits are sorted in ascending order, an $(N/4+1)^{th}$ encoded bit to an $(N/2+1)^{th}$ encoded bit are selected alternately, and an $(N/2+1)^{th}$ encoded bit to an $N^{th}$ encoded bit are sorted in natural order. Shown in FIG. 4 is a schematic diagram of a bit storage order according to an embodiment of this application.

0, 1, 2, . . . , and 15 are 16 bits in natural order, representing sequence numbers of locations of the encoded bits obtained after the polar encoding. In a storage process, bits corresponding to 0, 1, 2, and 3 are stored in natural order. A storage order of a bit corresponding to 4 keeps unchanged. A storage location of a bit corresponding to 5 changes from an original $6^{th}$ bit to a $7^{th}$ bit. A storage location of a bit corresponding to 6 changes from an original $7^{th}$ bit to a $9^{th}$ bit. For others, refer to FIG. 4. Details are not described herein. The encoded bits are stored in the foregoing bit storage order in both the puncture and the repetition.

Figure 5:
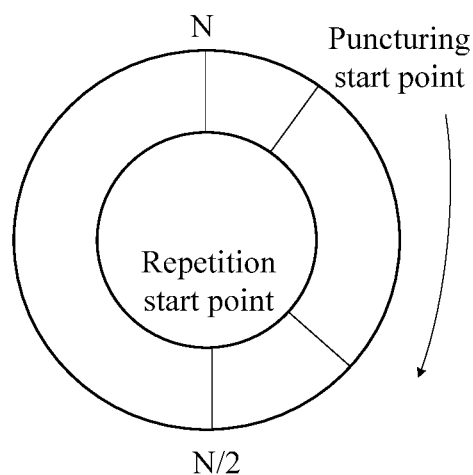
FIG. 5 is a schematic diagram of a bit reading order according to an embodiment of this application.

For a bit selection process, according to a selected rate matching scheme, a bit reading order is shown in FIG. 5. If the selected rate matching manner is puncturing, M bits are read from an $(N-M+1)^{th}$ of the encoded bits to an $N^{th}$ bit of the encoded bits in the cyclic cache, and a puncturing start point is shown in FIG. 5. If the selected rate matching manner is repetition, M bits in the cyclic cache are sequentially and cyclically read, starting from any location of the cyclic cache in natural order or in reversed order and a repetition start point is shown in FIG. 5.

In another specific example, the first rate matching manner is the shortening, and the second rate matching manner is the repetition. The foregoing interleaving manner is used to indicate a quantity Rn of rows, a quantity Cn of columns, and row-column interleaving or column-row interleaving, where both Rn and Cn are integer powers of 2, and N=Rn×Cn.

If the interleaving manner indicates the column-row interleaving, the bit storage order is sorting, by row, encoded bits obtained after bit reversal and column interleaving, where each row of the encoded bits is used as a sub-segment. The encoded bits obtained after bit reversal and column interleaving are encoded bits that are obtained after bit reversal and column interleaving are performed on the encoded bits obtained after the polar encoding.

Figure 6:
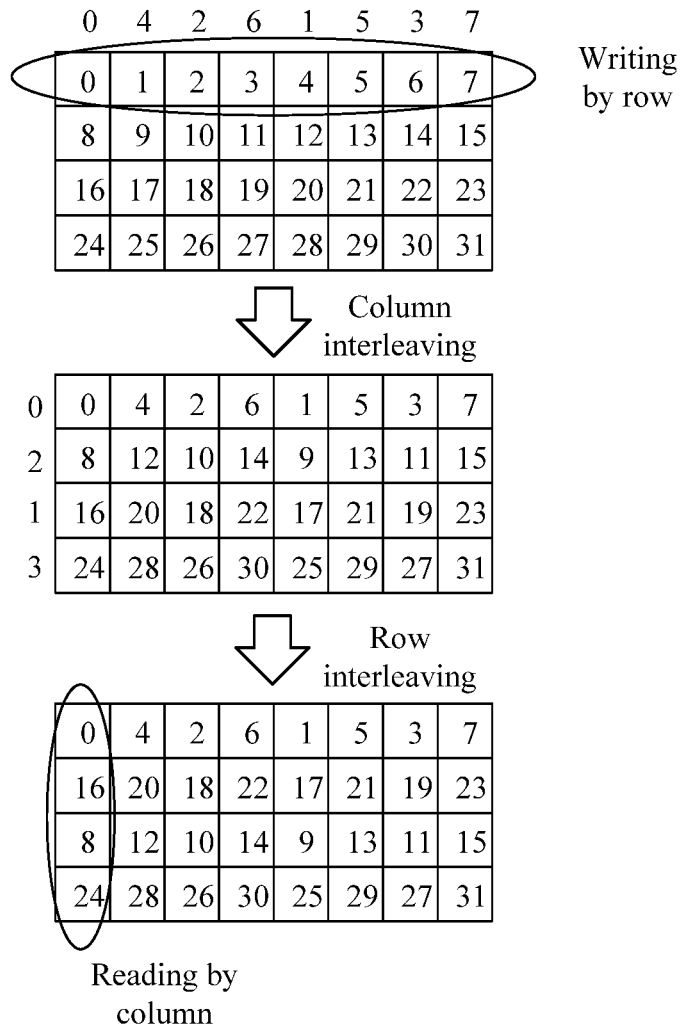
FIG. 6 is a schematic diagram of row-column interleaving of encoded bits according to an embodiment of this application.

FIG. 6 is a schematic diagram of row-column interleaving of encoded bits according to an embodiment of this application. As shown in FIG. 6, the encoded bits are written into the interleaver by row and are divided into four rows and eight columns. After bit reversal and column interleaving are performed, an original $2^{nd}$ column (1, 9, 17, 25) changes to a $5^{th}$ column, and an original $4^{th}$ column (3, 11, 19, 27) changes to a $7^{th}$ column. For others, refer to FIG. 6. Output of the interleaver is per-row output, to be specific, (0, 4, 2, 6, 1, 5, 3, 7) are output. A corresponding bit storage order is per-row sorting and storage, and to be specific, storage is performed according to the output of the interleaver.

If the selected rate matching manner is repetition, a bit reading order is sequentially and cyclically reading, in natural order or in reversed order by row and starting from any location in the encoded bits obtained after bit reversal and column interleaving, the encoded bits in the cyclic cache until M bits are read. The bit reading order is the foregoing per-row output order, to be specific, (0, 4, 2, 6, 1, 5, 3, 7, 8, 12, 10, . . . ) are read.

If the selected rate matching manner is shortening, a bit reading order is sequentially reading one bit from each sub-segment after bit reversal and row interleaving are performed on the encoded bits obtained after bit reversal and column interleaving, until M bits are read. For details, refer to FIG. 6. As shown in FIG. 6, after bit reversal and row interleaving are performed, an original $2^{nd}$ row (8, 12, . . . , 11, 15) changes to a current $3^{rd}$ row, and an original $3^{rd}$ row changes to a current $2^{nd}$ row. In a reading process, one bit is sequentially read from each sub-segment, in other words, the bits are read per column. This embodiment provides an example in which first four bits that are read are (0, 16, 8, 24).

The interleaving manner may alternatively indicate the row-column interleaving. In this case, the bit storage order is sorting, by column, encoded bits obtained after bit reversal and row interleaving. Each column of the encoded bits is used as a sub-segment, and the encoded bits obtained after bit reversal and row interleaving are encoded bits that are obtained after bit reversal and row interleaving are performed on the encoded bits obtained after the polar encoding. A bit reading order corresponding to the first rate matching manner is sequentially reading one bit from each sub-segment after bit reversal and column interleaving are performed on the encoded bits obtained after bit reversal and row interleaving, until M bits are read. A bit reading order corresponding to the second rate matching manner is sequentially and cyclically reading, in natural order or in reversed order by column and starting from any location in the encoded bits obtained after bit reversal and row interleaving, the encoded bits in the cyclic cache until M bits are read. A specific implementation is similar to the column-row interleaving. Details are not described herein again in this embodiment.

In still another specific example, the first rate matching manner is the shortening or puncturing, and the second rate matching manner is the repetition.

If the selected rate matching manner is the shortening or puncturing, a bit reading order is sequentially reading the cyclic cache in natural order or in reversed order. When a sequence number, obtained after bit reversal, corresponding to a current sequence number (starting from 0) is greater than or equal to the target code length M, current bit is skipped. For example, if the mother code length is 16 and the target code length is 12, a $4^{th}$ bit (whose sequence number is 3, where a sequence number, obtained after bit reversal, corresponding to 3 is 12) is skipped during reading, to implement shortening or puncturing of a code length. The sequence number, obtained after bit reversal, corresponding to the current sequence number is an implementation of the first set.

If the selected rate matching manner is repetition, a bit reading order corresponding to the second rate matching manner is: sequentially and cyclically reading, M bits starting from any location of the cyclic cache in natural order or in reversed order in the cyclic cache A reading manner is similar to the foregoing reading manner for repetition. Details are not described herein again in this embodiment.

The foregoing disclosure describes, by using examples, implementations in which the interleaver supports two rate matching manners. In a specific implementation process, the bit storage order and the bit reading order may be implemented in another manner. Details are not described herein in this embodiment. The following describes, by using an example, an implementation in which an interleaver supports three rate matching manners.

Figure 7:
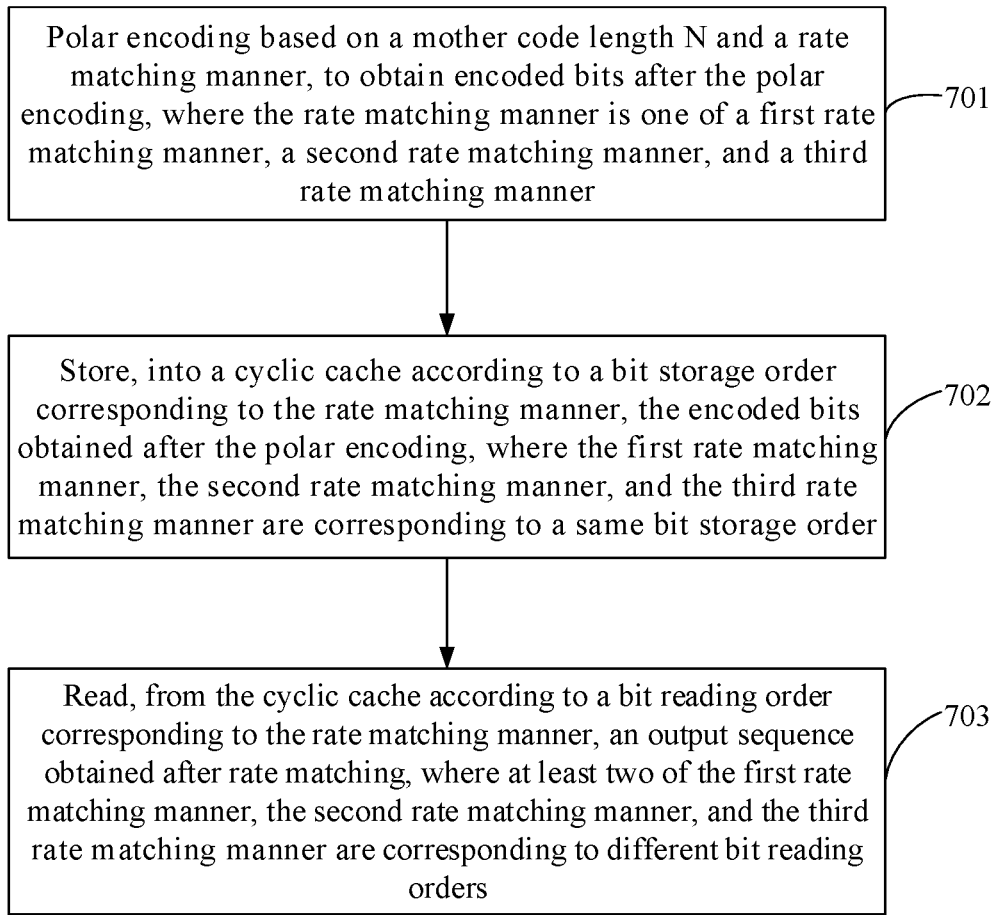
FIG. 7 is a flowchart of a polar code rate matching method according to another embodiment of this application.

FIG. 7 is a flowchart of a polar code rate matching method according to an embodiment of this application. The method provided in this embodiment is applicable to the foregoing process of performing rate matching by the encoder. In this embodiment, an encoder supports three rate matching manners, which are specifically rate matching manners respectively corresponding to shortening, puncturing, and repetition. The method provided in this embodiment includes the following steps.

Step 701: Polar encoding according to a mother code length N and a rate matching manner, to obtain encoded bits after the polar encoding, where the rate matching manner is one of a first rate matching manner, a second rate matching manner, and a third rate matching manner.

Step 702: Store, into a cyclic cache according to a bit storage order corresponding to the rate matching manner, the encoded bits, where the first rate matching manner, the second rate matching manner, and the third rate matching manner are corresponding to a same bit storage order.

Step 703: Read, from the cyclic cache according to a bit reading order corresponding to the rate matching manner, an output sequence obtained after rate matching, wherein at least two of the first rate matching manner, the second rate matching manner, and the third rate matching manner are corresponding to different bit reading orders.

An implementation of this embodiment is similar to the embodiment shown in FIG. 3. For similar parts, refer to the descriptions of the embodiment in FIG. 3. Details are not described herein again. A difference of the implementation of this embodiment from the embodiment shown in FIG. 3 lies in that the encoder supports three rate matching manners in this embodiment. Specifically, the first rate matching manner is puncturing, and a corresponding target code length M is less than the mother code length N. The second rate matching manner is shortening, and a corresponding target code length M is less than the mother code length N. The third rate matching manner is repetition, and a corresponding target code length M is greater than the mother code length N.

In this embodiment, likewise, there are correspondingly three possible implementations. Details are as follows.

In a first implementation, interleaving is first performed on the encoded bits, to obtain interleaved bits; then bit collection is performed, and the encoded bits are stored into the cyclic cache; and then bit selection is performed. In an interleaving, two factors need to be considered for interleaving: puncturing and shortening. To be specific, interleaving is determined by using a puncturing bit and a shortening bit together. A first bit is set as the puncturing bit, and a last bit is set as the shortening bit. In a bit selection, last M bits are read in the puncturing, first M bits are read in the shortening, and M bits are cyclically read starting from any location in the repetition.

Specifically, the bit storage order in this embodiment includes a first storage order and a second storage order, where the first rate matching manner is used to indicate the first storage order in advance, and the second rate matching manner is used to indicate the second storage order in advance. The first rate matching manner may be the puncturing, and the second rate matching manner may be the shortening.

The first storage order is used to indicate a storage order, in the cyclic cache, of first N/2 bits of the encoded bits, and the second storage order is used to indicate a storage order, in the cyclic cache, of last N/2 bits of the encoded bits.

Alternatively, the first storage order is used to indicate a storage order, in the cyclic cache, of last N/2 bits of the encoded bits, and the second storage order is used to indicate a storage order, in the cyclic cache, of first N/2 bits of the encoded bits.

The first storage order includes at least one or a combination of the following:
a descending order,
an ascending order,
a descending order of reliability,
an ascending order of reliability,
a random order,
an order corresponding to bitwise linear interleaving, and
a reversed order of an order corresponding to bitwise linear interleaving.

The second storage order includes at least one or a combination of the following:
a descending order,
an ascending order,
a descending order after bit reversal,
an ascending order after bit reversal,
a descending order of reliability,
an ascending order of reliability,
a random order,
an ascending order after offset bit reversal,
a descending order after offset bit reversal,
an order corresponding to bitwise linear interleaving, and
a reversed order of an order corresponding to bitwise linear interleaving.

To sum up, the puncturing, the shortening, and the repetition provided in this embodiment of this application are corresponding to a same bit storage order, but the bit storage order is determined according to a full consideration of two factors: puncturing and shortening.

To implement different output sequences for different rate matching manners, the first rate matching manner, the second rate matching manner, and the third rate matching manner in this embodiment are corresponding to different bit reading orders. To be specific, an output sequence obtained after rate matching is read from the cyclic cache according to a bit reading order corresponding to a selected rate matching manner.

For example, in the cyclic cache, the first storage order is used for the first N/2 bits of the encoded bits, and the second storage order is used for the last N/2 bits of the encoded bits. A bit reading order corresponding to the puncturing is sequentially reading M bits from an $(N-M+1)^{th}$ bit to an $N^{th}$ bit (wherein the puncturing bits are from a first bit to an $(N-M)^{th}$ bit) in the cyclic cache. A bit reading order corresponding to the shortening is sequentially reading M bits from a first bit to an $M^{th}$ bit (wherein the shortening bits are from an $(M+1)^{th}$ bit to an $N^{th}$ bit) in the cyclic cache. For another example, in the cyclic cache, the first storage order is used for the last N/2 bits of the encoded bits, and the second storage order is used for the first N/2 bits of the encoded bits. A bit reading order corresponding to the puncturing is sequentially reading from a first bit to an $M^{th}$ bit (wherein the puncturing bits are from an $(M+1)^{th}$ bit to an $N^{th}$ bit) in the cyclic cache. A bit reading order corresponding to the shortening is sequentially reading from an $(N-M+1)^{th}$ bit to an $N^{th}$ bit (wherein the shortening bits are from a first bit to an $(N-M)^{th}$ bit) in the cyclic cache. A bit reading order corresponding to the repetition is sequentially and cyclically reading, starting from any location and in natural order or in reversed order, the encoded bits in the cyclic cache, until M bits are read.

In the following two examples, descriptions are provided assuming that the first rate matching manner is the puncturing, and the second rate matching manner is the shortening. The first storage order is for the first N/2 bits of the encoded bits, and the second storage order is for the last N/2 bits of the encoded bits. A case in which the first storage order is for the last N/2 bits of the encoded bits, and the second storage order is for the first N/2 bits of the encoded bits is similar. Details are not described herein.

Figure 8:
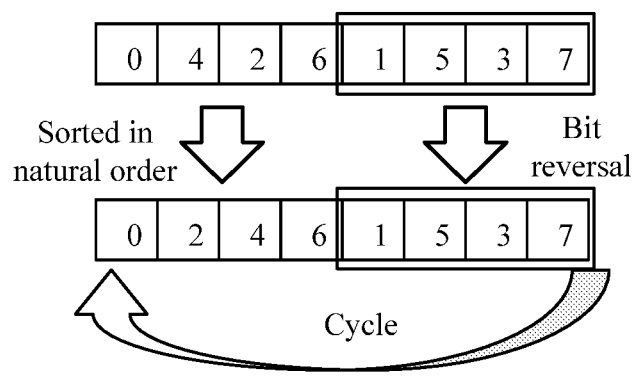
FIG. 8 is an example of bit storage order according to an embodiment of this application.

In a first example, the bit storage order may be implemented by segmented interleaving. As shown in FIG. 8, bit reversal is performed on (0, 1, 2, 3, 4, 5, 6, 7) that are sorted in natural order, to obtain (0, 4, 2, 6, 1, 5, 3, 7). The second storage order is that a storage order of an $(N/2+1)^{th}$ bit to an $N^{th}$ bit, wherein the storage order of an $(N/2+1)^{th}$ bit to an $N^{th}$ bit is from an $(N/2+1)^{th}$ bit to an $N^{th}$ bit that are obtained after bit reversal. This is designed for shortening. The first storage order is that remaining bits, namely, bits in odd locations, are sorted in natural order. This is designed for puncturing.

Figure 9:
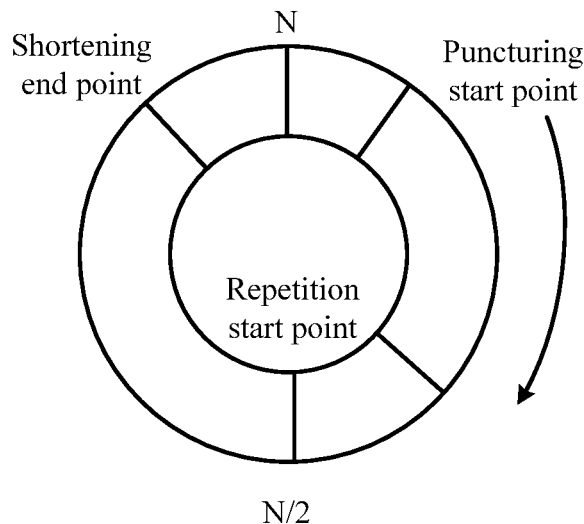
FIG. 9 is a schematic diagram of a bit reading order according to an embodiment of this application.

FIG. 9 is a schematic diagram of bit reading order according to an embodiment of this application. As shown in FIG. 9, a bit length of the encoded bits is N. FIG. 9 shows a puncturing start point, a shortening start point, and a repetition start point. A bit reading order corresponding to the puncturing is sequentially reading M bits from an $(N-M+1)^{th}$ bit (the puncturing start point) to an $N^{th}$ bit in the cyclic cache. A bit reading order corresponding to the shortening is sequentially reading M bits from a first bit (the shortening start point) to an $M^{th}$ bit in the cyclic cache. A bit reading order corresponding to the repetition is sequentially and cyclically reading M bits starting from any location of the cyclic cache in natural order or in reversed order in the cyclic cache.

The interleaving manner is the same regardless of whether the rate matching manner initially selected by the encoder is the puncturing, the shortening, or the repetition. An order of the interleaved bits, namely, the bit storage order, is shown in FIG. 8. In a reading process, a bit reading order corresponding to the initially selected rate matching manner is selected according to the foregoing bit reading order, to perform reading.

In the example shown in FIG. 9, if the first storage order is used for the last N/2 bits of the encoded bits, and the second storage order is used for the first N/2 bits of the encoded bits, an order of the first N/2 bits is equivalent to a reversed order of last N/2 bits shown in FIG. 9, and an order of the last N/2 bits is equivalent to a reversed order of first N/2 bits shown in FIG. 9. The bit storage order is 7, 3, 5, 1, 6, 4, 2, 0. When reading is performed in reversed order, content obtained by reading is the same as that in FIG. 9.

Figure 10:
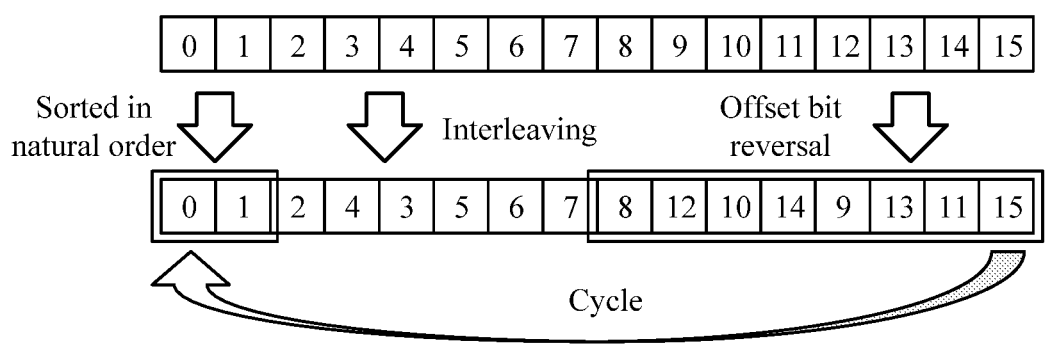
FIG. 10 is another example of a bit storage order according to an embodiment of this application.
Figure 11:
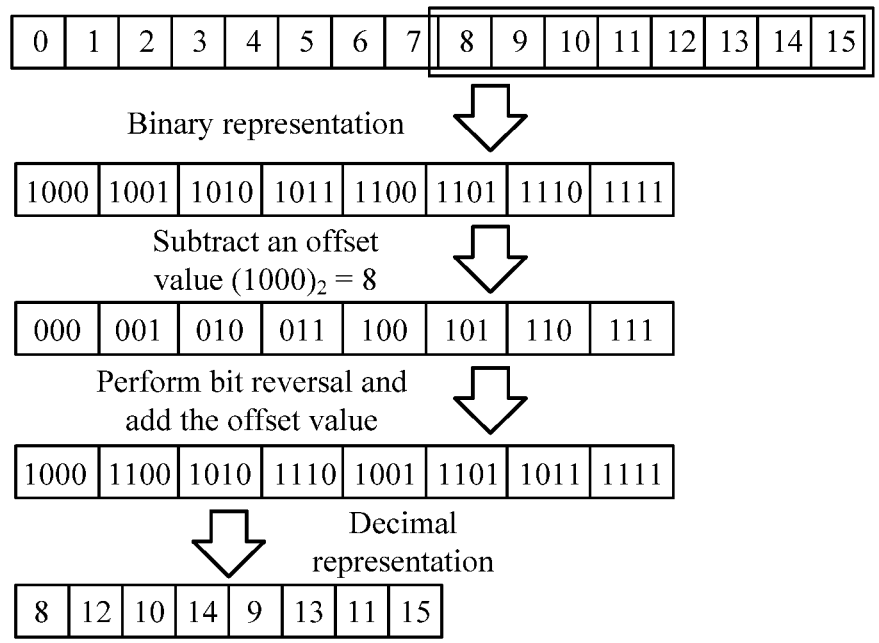
FIG. 11 is a schematic diagram of offset bit reversal according to an embodiment of this application.

In a second example, the bit storage order may be implemented by segmented interleaving. As shown in FIG. 10, the first storage order is that: the first bit to the $(N/8)^{th}$ bit are stored in a natural order, the $(N/8+1)^{th}$ bit to the $(3N/8)^{th}$ bit are stored according to an order obtained after a bitwise linear interleaving is performed between the $(N/8+1)^{th}$ bit to an the $(N/4)^{th}$ bit and the $(N/4+1)^{th}$ bit to the $(3N/8)^{th}$ bit, and the $(3N/8+1)^{th}$ bit to the $(N/2)^{th}$ bit are stored in natural order. The second storage order is that an $(N/2+1)^{th}$ bit to an $N^{th}$ bit are sorted in an order obtained after offset bit reversal. The order obtained after offset bit reversal is obtained by subtracting an offset value from a sequence in natural order whose first bit is not 1, performing bit reversal on an offset sequence, and adding the offset value. FIG. 11 is a schematic diagram of offset bit reversal according to an embodiment of this application.

Bit reading orders of rate matching manners in this embodiment are similar to those in FIG. 9 in the foregoing example. Details are not described herein again in this embodiment.

In a second implementation, interleaving processing is first performed on the encoded bits, to obtain interleaved bits; then bit collection is performed, and the interleaved bits are stored into the cyclic cache; and then bit selection is performed. In this embodiment, in an interleaving process, a puncturing bit or a shortening bit may be set in any location of the interleaved bits. To improve interleaving efficiency, interleaving may be performed in natural order or in reversed order. In a bit selection process, the puncturing bit or the shortening bit only needs to be skipped. In this implementation, the interleaving implementation may alternatively not be used; instead, a manner of performing storage in natural order or in reversed order may be used for implementation.

Figure 12:
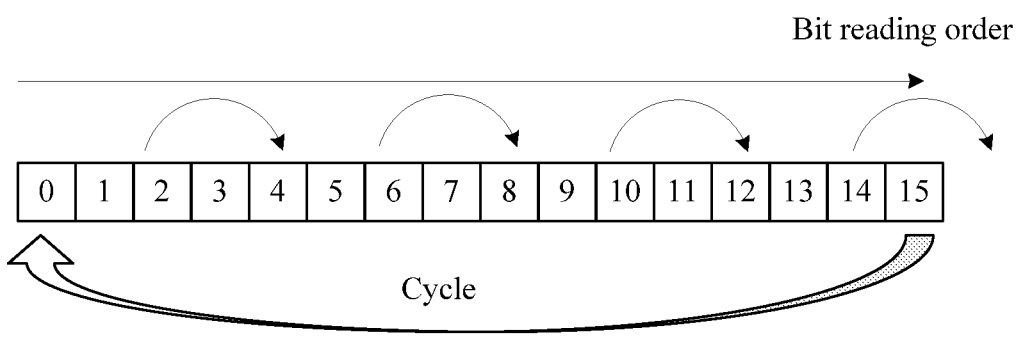
FIG. 12 is another schematic diagram of bit reading order according to an embodiment of this application.

Specifically, a sequence number of a puncturing bit in the first rate matching manner is recorded in a first set, and a sequence number of a shortening bit in the second rate matching manner is recorded in a second set. FIG. 12 is yet another schematic diagram of a bit reading order according to an embodiment of this application. As shown in FIG. 12, in a reading process, a bit reading order corresponding to the first rate matching manner is that the cyclic cache is sequentially read in natural order or in reversed order. When a sequence number corresponding to a current bit is in the first set, the current bit is skipped and the reading continues until a last bit is read. A bit reading order corresponding to the second rate matching manner is: sequentially reading the cyclic cache in natural order or in reversed order; and when a sequence number corresponding to a current bit is in the second set, skipping the current bit, and continuing with reading until a last bit is read. A bit reading order corresponding to the third rate matching manner is sequentially and cyclically reading, starting from any location of the cyclic cache in natural order or in reversed order, the encoded bits in the cyclic cache, until M bits are read.

In a third implementation, interleaving processing is first performed on the encoded bits, to obtain interleaved bits; and then bit collection is performed, and the interleaved bits are stored into the cyclic cache. In this embodiment, in an interleaving process, a puncturing bit or a shortening bit may be set in any location of the interleaved bits. To improve interleaving efficiency, interleaving may be performed in natural order or in reversed order. In a bit collection process, the puncturing bit or the shortening bit is deleted, none of stored bits include the puncturing bit or the shortening bit, and the stored bits are sequentially read. If there is no puncturing bit or shortening bit, no deletion operation needs to be performed. In this implementation, the interleaving implementation may alternatively not be used. Instead, a manner of performing storage in natural order or in reversed order may be used for implementation.

In this case, the first rate matching manner and the second rate matching manner are corresponding to a same bit reading order: reading, starting from a first bit in the cyclic cache, M bits in natural order, or reading, starting from a last bit in the cyclic cache, M bits in reversed order A bit reading order corresponding to the third rate matching manner is sequentially and cyclically reading, starting from any location and in natural order or in reversed order, the encoded bits in the cyclic cache, until M bits are read.

In the second implementation and the third implementation, the first rate matching manner and the second rate matching manner may are corresponding to two bit storage orders, as described in the foregoing embodiment, or may are corresponding to the same one bit storage order. In a specific implementation process, different rate matching manners have the same one bit storage order, different bit storage orders may be implemented by using different interleaving manners. The bit storage order of the encoded bits in the cyclic cache includes at least one or a combination of the following:

in descending order,
in ascending order,
in descending order after bit reversal,
in ascending order after bit reversal,
in descending order of reliability,
in ascending order of reliability,
in random order,
in ascending order after offset bit reversal,
in descending order after offset bit reversal, and
in an order corresponding to bitwise linear interleaving.

According to the polar code rate matching method provided in this embodiment, the encoder performs polar encoding according to the mother code length N and the rate matching manner, to obtain the encoded bits after the polar encoding. The rate matching manner is one of the first rate matching manner, the second rate matching manner, and the third rate matching manner. The encoded bits are stored into the cyclic cache according to the bit storage order corresponding to the rate matching manner. The first rate matching manner, the second rate matching manner, and the third rate matching manner are corresponding to the same bit storage order, so that the first rate matching manner, the second rate matching manner, and the third rate matching manner are corresponding to a same interleaving order. One interleaver can be used to implement the three rate matching manners, thereby reducing hardware complexity and an area occupied by hardware. The encoder reads, from the cyclic cache according to the bit reading order corresponding to the rate matching manner, the output sequence obtained after rate matching. At least two of the first rate matching manner, the second rate matching manner, and the third rate matching manner are corresponding to different bit reading orders, so that different outputs are implemented for different rate matching manners, and it is ensured that the encoder can output a correct output sequence to a decoder.

An embodiment of this application further provides a method for polar code rate matching. According to the method, a storage order of encoded bits in a cyclic cache may be implemented according to a rate matching manner and by inserting an interleaving process between polar code encoding output and the cyclic cache.

Specifically, if a puncturing is used, no interleaving is performed, and encoded bits are directly input into the cyclic cache. If a shortening is used, bit reversal and interleaving are performed, and interleaved bits are input into the cyclic cache. If a repetition is used, no interleaving is performed, and encoded bits are directly input into the cyclic cache. In other words, three rate matching manners can be supported by using one interleaver, thereby reducing hardware complexity and a hardware area.

At a decoder, for decoding manners for the puncturing, the shortening, and the repetition, refer to the decoding manners in the descriptions of the three rate matching manners in the foregoing embodiments.

The implementations or examples provided in the foregoing embodiments are implementations provided for understanding the embodiments of this application, and may be combined, used as references, or implemented independently in a specific implementation process. Specific implementations are not particularly limited herein in this embodiment.

The foregoing mainly describes the solutions provided in the embodiments of this application from a perspective of an encoder. It may be understood that to implement the foregoing functions, the encoder includes corresponding hardware structures and/or software modules for executing the functions. With reference to units and algorithm steps of examples described in embodiments that are disclosed in the embodiments of this application, the embodiments of this application may be implemented by hardware, or a combination of hardware and computer software. Whether a function is executed by the hardware or by the computer software driving the hardware depends on particular applications and design constraint conditions of the technical solutions. Different methods may be used to implement the described functions for each particular application, but it should not be considered that the implementation goes beyond the scope of the technical solutions of the embodiments of this application.

The embodiments further provide a polar code rate matching device, where the rate matching device may be a foregoing network device used as an encoder, or may be the foregoing terminal used as an encoder.

Figure 13:
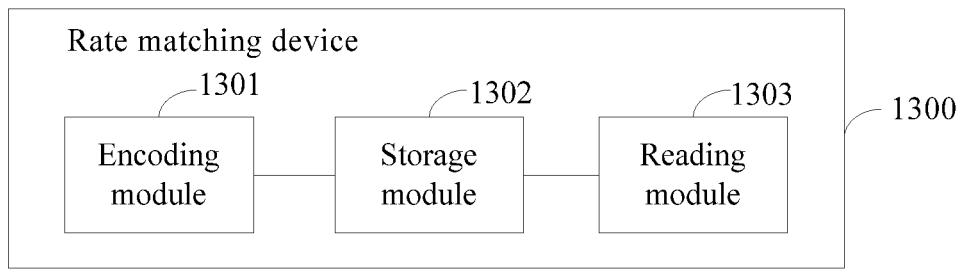
FIG. 13 is a block diagram of a polar code rate matching device according to an embodiment of this application.

FIG. 13 is a block diagram of a polar code rate matching device according to an embodiment of this application. As shown in FIG. 13, the device 1300 includes an encoding module 1301, a storage module 1302, and a reading module 1303. The encoding module 1301 is configured to perform polar encoding according to a mother code length N and a rate matching manner, to obtain encoded bits after the polar encoding, where the rate matching manner is one of a first rate matching manner, a second rate matching manner, and a third rate matching manner, and N is a positive integer. The storage module 1302 is configured to store, into a cyclic cache according to a bit storage order corresponding to the rate matching manner, the encoded bits obtained after the polar encoding, where the first rate matching manner, the second rate matching manner, and the third rate matching manner are corresponding to a same bit storage order. The reading module 1303 is configured to read, from the cyclic cache according to a bit reading order corresponding to the rate matching manner, an output sequence obtained after rate matching, where at least two of the first rate matching manner, the second rate matching manner, and the third rate matching manner are corresponding to different bit reading orders.

Optionally, a length of the output sequence is a target code length M, where M is an integer. A target code length M corresponding to the first rate matching manner is less than the mother code length N. A target code length M corresponding to the second rate matching manner is less than the mother code length N. A target code length M corresponding to the third rate matching manner is greater than the mother code length N.

Optionally, the first rate matching manner, the second rate matching manner, and the third rate matching manner are corresponding to different bit reading orders.

Optionally, the storage module 1302 is specifically configured to: interleaving, according to an interleaving manner corresponding to the rate matching manner, on the encoded bits, to obtain interleaved bits, wherein the bit storage order is the same as an order of the interleaved bits; and bit collect on the interleaved bits, and store the interleaved bits into the cyclic cache.

Optionally, the bit storage order includes a first storage order and a second storage order, wherein the first storage order is pre-configured according to the first rate matching manner, and wherein the second storage order is pre-configured according to the second rate matching manner. The first storage order in the cyclic cache, is a storage order of first N/2 bits of the encoded bits in the cyclic cache, and the second storage order is a storage order, of last N/2 bits of the encoded bits in the cyclic cache. The first storage order is a storage order of last N/2 bits of the encoded bits in the cyclic cache, and the second storage order is a storage order, of first N/2 bits of the encoded bits in the cyclic cache.

Optionally, the first storage order includes at least one or a combination of the following:
  a descending order, an ascending order,
  a descending order of reliability,
  an ascending order of reliability,
  a random order,
  an order corresponding to bitwise linear interleaving, and
  a reversed order of an order corresponding to bitwise linear interleaving.

The second storage order includes at least one or a combination of the following:
  a descending order,
  an ascending order,
  a descending order after bit reversal,
  an ascending order after bit reversal,
  a descending order of reliability,
  an ascending order of reliability,
  a random order,
  an ascending order after offset bit reversal,
  a descending order after offset bit reversal,
  an order corresponding to bitwise linear interleaving, and
  a reversed order of an order corresponding to bitwise linear interleaving.

Optionally, when the first storage order is the storage order of the first N/2 bits of the encoded bits in the cyclic cache, and the second storage order is used for the last N/2 bits of the encoded bits obtained after the polar encoding, a bit reading order corresponding to the first rate matching manner is sequentially reading an $(N-M+1)^{th}$ bit to an $N^{th}$ bit in the cyclic cache, and a bit reading order corresponding to the second rate matching manner is sequentially reading a first bit to an $M^{th}$ bit in the cyclic cache. If the first storage order is used for the last N/2 bits of the encoded bits obtained after the polar encoding, and the second storage order is for the first N/2 bits of the encoded bits obtained after the polar encoding, a bit reading order corresponding to the first rate matching manner is sequentially reading a first bit to an $M^{th}$ bit in the cyclic cache, and a bit reading order corresponding to the second rate matching manner is sequentially reading an $(N-M+1)^{th}$ bit to an $N^{th}$ bit in the cyclic cache. A bit reading order corresponding to the third rate matching manner is sequentially and cyclically reading, starting from any location and in natural order or in reversed order, the encoded bits in the cyclic cache until M bits are read.

Optionally, a sequence number of a puncturing bit in the first rate matching manner is in a first set, and a sequence number of a shortening bit in the second rate matching manner is in a second set. A bit reading order corresponding to the first rate matching manner is: sequentially reading the cyclic cache in natural order or in reversed order; and when a sequence number corresponding to a current bit is in the first set, skipping the current bit, and continuing with reading until a last bit is read A bit reading order corresponding to the second rate matching manner is: sequentially reading the cyclic cache in natural order or in reversed order; and when a sequence number corresponding to a current bit is in the second set, skipping the current bit, and continuing with reading until a last bit is read. A bit reading order corresponding to the third rate matching manner is: sequentially and cyclically reading, starting from any location and in natural order or in reversed order, the encoded bits in the cyclic cache until M bits are read.

Optionally, the first rate matching manner and the second rate matching manner are corresponding to a same bit reading order, and the first rate matching manner and the third rate matching manner are corresponding to different bit reading orders.

Optionally, the storage module 1302 is specifically configured to:

perform, according to an interleaving manner corresponding to the rate matching manner, interleaving processing on the encoded bits obtained after the polar encoding, to obtain interleaved bits, where the bit storage order is the same as an order of the interleaved bits; and perform bit collection on the interleaved bits, and store the interleaved bits into the cyclic cache, where a puncturing bit or a shortening bit in the interleaved bits is deleted in a bit collection process.

Optionally, the interleaving manner is used to indicate a quantity Rn of rows, a quantity Cn of columns, and row-column interleaving or column-row interleaving. Both Rn and Cn are integer powers of 2, and N=Rn×Cn. If the interleaving manner indicates the column-row interleaving, the bit storage order is sorting, by row, encoded bits obtained after bit reversal and column interleaving. Each row of the encoded bits is used as a sub-segment, and the encoded bits obtained after bit reversal and column interleaving are encoded bits that are obtained after bit reversal and column interleaving are performed on the encoded bits obtained after the polar encoding.

Optionally, the storage module 1302 is specifically configured to: perform, according to the bit storage order corresponding to the rate matching manner, bit collection on the encoded bits, and store the encoded bits into the cyclic cache. A puncturing bit or a shortening bit in the encoded bits is deleted in a bit collection process, and the bit storage order is performing storage in natural order or in reversed order.

Optionally, a bit reading order corresponding to the first rate matching manner is reading, in natural order, a first bit to a last bit in the cyclic cache, or reading, in reversed order, a last bit to a first bit in the cyclic cache. A bit reading order corresponding to the third rate matching manner is sequentially and cyclically reading, M encoded bits starting from any location and in natural order or in reversed order, in the cyclic cache.

The rate matching device provided in this embodiment is configured to perform the method embodiments shown in FIG. 3 and FIG. 7. Implementation principles and technical effects thereof are similar, and details are not described herein again in this embodiment.

Figure 14:
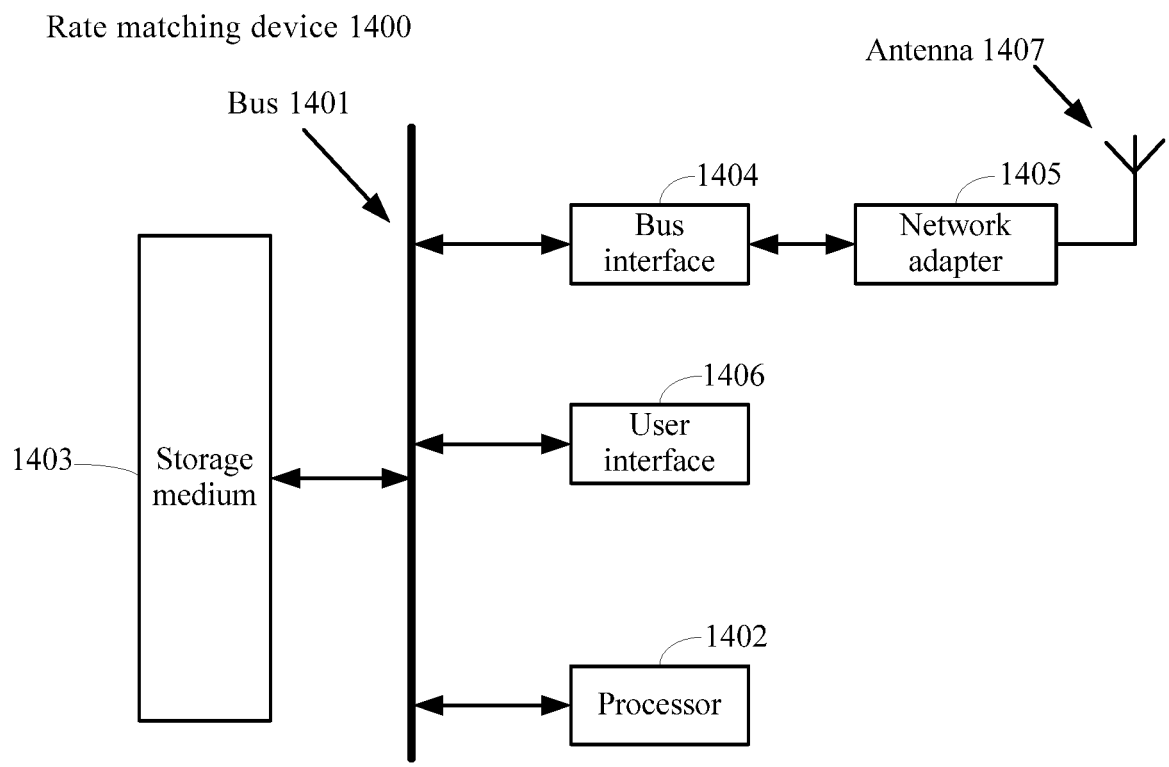
FIG. 14 is a structural diagram of a polar code rate matching device according to an embodiment of this application.

FIG. 14 is a structural diagram of a device for polar code rate matching according to an embodiment of this application. The rate matching device 1400 may be a communications device such as the foregoing network device or terminal, or a chip, or the like. As shown in FIG. 14, the rate matching device 1400 may be implemented by using a bus 1401 as a general bus system structure. According to specific applications and overall design constraint conditions of the rate matching device 1400, the bus 1401 may include any quantity of interconnection buses and bridges. The bus 1401 connects various circuits together. These circuits include a processor 1402, a storage medium 1403, and a bus interface 1404. Optionally, the rate matching device 1400 connects a network adapter 1405 and the like through the bus 1401 by using the bus interface 1404. The network adapter 1405 may be configured to implement a signal processing function at a physical layer on a wireless communications network, and implement sending and receiving of radio frequency signals by using an antenna 1407. A user interface 1406 may be connected to a user terminal such as a keyboard, a display, a mouse, or a joystick. The bus 1401 may be further connected to other circuits such as a timing source, a peripheral device, a voltage regulator, and a power management circuit. These circuits are well-known in the art, and therefore details are not described.

Alternatively, the rate matching device 1400 may be configured as a general-purpose processing system, for example, generally referred to as a chip. The general-purpose processing system includes: one or more microprocessors that provide a processor function, and an external memory that provides at least a part of a storage medium 1503. All these are connected to other support circuits by using an external bus system structure.

Alternatively, the rate matching device 1400 may be implemented by using the following: an application-specific integrated circuit (ASIC) that has the processor 1402, the bus interface 1404, and the user interface 1406; and at least a part of the storage medium 1403 integrated in a single chip. Alternatively, the rate matching device 1400 may be implemented by using the following: one or more field-programmable gate arrays (FPGA), a programmable logic device (PLD), a controller, a state machine, gate logic, a discrete hardware component, any other appropriate circuits, or any combination of circuits that can execute functions described throughout the embodiments of this application.

The processor 1402 is responsible for bus management and general processing (including executing software stored in the storage medium 1403). The processor 1402 may be implemented by using one or more general-purpose processors and/or dedicated processors. Examples of the processor include a microprocessor, a micro controller, a DSP, and other circuits that can execute software. The software should be generally explained as representing an instruction, data, or any combination thereof, regardless of whether the software is referred to as software, firmware, middleware, microcode, a hardware description language, or others.

As shown in FIG. 14, the storage medium 1403 is separated from the processor 1402. However, it can easily be figured out that the storage medium 1403 or any part of the storage medium 1403 may be located outside the rate matching device 1400. For example, the storage medium 1403 may include a transmission line, a carrier waveform modulated by using data, and/or a computer artifact separated from a wireless node. All these media can be accessed by the processor 1402 by using the bus interface 1404. Alternatively, the storage medium 1403 or any part of the storage medium 1403 may be integrated into the processor 1402. For example, the storage medium 1403 may be a cache and/or a general-purpose register.

The processor 1402 may execute the foregoing embodiments, for example, the foregoing embodiments sequentially corresponding to FIG. 2 to FIG. 12. An execution process of the processor 1402 is not described in detail herein.

The foregoing encoding module, storage module, and reading module may be implemented as a processor.

An embodiment of this application further provides a computer program product. The computer program product includes computer program code. When running on a computer, the computer program code enables the computer to perform the polar code rate matching method in the foregoing embodiments.

An embodiment of this application provides a chip, including a memory and a processor. The memory is configured to store a computer program. The processor is configured to invoke, from the memory, and run the computer program, so that the processor performs the polar code rate matching method in the foregoing embodiments.

What is claimed is:

1. A method for use in a wireless communication network, comprising:
   obtaining, by a communication device, K information bits, wherein K≥1;
   generating, by the communication device, a to-be-encoded sequence having a length of N bits, wherein the to-be-encoded sequence comprises the K information bits and L frozen bits, wherein L is larger than or equal to (N−M), N is an integer power of 2, and M is a positive integer and less than N; and wherein L bit positions of the to-be-encoded sequence for placing the L frozen bits are determined according to a rate match manner;
   polar encoding, by the communication device, the to-be-encoded sequence, to obtain an encoded sequence;
   interleaving, by the communication device, the encoded sequence, to obtain an interleaved sequence;
   sequentially storing, by the communication device, the interleaved sequence into a cyclic cache of the communication device; and
   sequentially outputting, by the communication device, M bits of the interleaved sequence from the cyclic cache according to the rate matching manner.

2. The method according to claim 1, wherein the rate matching manner is puncturing, and the $(N-M+1)^{th}$ bit to the $N^{th}$ bit of the interleaved sequence are output from the cyclic cache.

3. The method according to claim 1, wherein the rate matching manner is shortening, and the first bit to the $M^{th}$ bit of the interleaved sequence are output from the cyclic cache.

4. The method according to claim 1, wherein polar encoding the to-be-encoded sequence to obtain the encoded sequence comprises:
   generating a binary row vector $u_1^N=(u_1, u_2, K, u_N)$, wherein the binary row vector corresponds to the to be encoded sequence; and
   encoding the binary row vector $u_1^N$ according an encoding formula, to obtain the encoded bit sequence;
   wherein the encoding formula is:

$$x_1^N = u_1^N G_N,$$

wherein $x_1^N=(x_1, x_2, \ldots, x_N)$ is the encoded bit sequence, and $G_N$ is a polar code generating matrix of N rows and N columns.

5. A device in a wireless communication network, comprising a processor, a cyclic cache, and a memory storing program instructions for execution by the processor; wherein when executed by the processor, the program instructions cause the device to:
   obtain K information bits, wherein K≥1;
   generate a to-be-encoded sequence having a length of N bits, wherein the to-be-encoded sequence comprises the K information bits and L frozen bits, wherein L is larger than or equal to (N−M), N is an integer power of 2, and M is a positive integer and less than N; and wherein L bit positions of the to-be-encoded sequence for placing the L frozen bits are determined according to a rate match manner;
   polar encode the to-be-encoded sequence, to obtain an encoded sequence;
   interleave the encoded sequence, to obtain an interleaved sequence;
   sequentially store the interleaved sequence into a cyclic cache of the communication device; and
   sequentially output M bits of the interleaved sequence from the cyclic cache according to the rate matching manner.

6. The device according to claim 5, wherein the rate matching manner is puncturing, and the $(N-M+1)^{th}$ bit to the $N^{th}$ bit of the interleaved sequence are output from the cyclic cache.

7. The device according to claim 5, wherein the rate matching manner is shortening, and the first bit to the $M^{th}$ bit of the interleaved sequence are output from the cyclic cache.

8. The device according to claim 5, wherein in polar encoding the to-be-encoded sequence to obtain the encoded sequence, by executing the program instructions, the processor is configured to:
   generating a binary row vector $u_1^N=(u_1, u_2, K, u_N)$, wherein the binary row vector corresponds to the to be encoded sequence; and
   encoding the binary row vector $u_1^N$ according an encoding formula, to obtain the encoded bit sequence;
   wherein the encoding formula is:

$$x_1^N = u_1^N G_N,$$

wherein $x_1^N=(x_1, x_2, \ldots, x_N)$ is the encoded bit sequence, and $G_N$ is a polar code generating matrix of N rows and N columns.

9. A non-transitory computer readable medium storing program codes thereon for execution by a processor in a communication device, wherein the program codes comprise instructions for:
   obtaining K information bits, wherein K≥1;
   generating a to-be-encoded sequence having a length of N bits, wherein the to-be-encoded sequence comprises the K information bits and L frozen bits, wherein L is larger than or equal to (N−M), N is an integer power of 2, and M is a positive integer and less than N; and wherein L bit positions of the to-be-encoded sequence for placing the L frozen bits are determined according to a rate match manner;
   polar encoding the to-be-encoded sequence, to obtain an encoded sequence;

interleaving the encoded sequence, to obtain an interleaved sequence;

sequentially storing the interleaved sequence into a cyclic cache of the communication device; and sequentially outputting M bits of the interleaved sequence from the cyclic cache according to the rate matching manner.

10. The non-transitory computer readable medium according to claim 9, wherein the rate matching manner is puncturing, and the $(N-M+1)^{th}$ bit to the $N^{th}$ bit of the interleaved sequence are output from the cyclic cache.

11. The non-transitory computer readable medium according to claim 9, wherein the rate matching manner is shortening, and the first bit to the $M^{th}$ bit of the interleaved sequence are output from the cyclic cache.

12. The non-transitory computer readable medium according to claim 9, wherein the instructions for polar encoding the to-be-encoded sequence to obtain the encoded sequence:

generating a binary row vector $u_1^N = (u_1, u_2, K, u_N)$, wherein the binary row vector corresponds to the to be encoded sequence; and encoding the binary row vector $u_1^N$ according an encoding formula, to obtain the encoded bit sequence;

wherein the encoding formula is:

$$x_1^N = u_1^N G_N,$$

wherein $x_1^N = (x_1, x_2, \ldots, x_N)$ is the encoded bit sequence, and $G_N$ is a polar code generating matrix of N rows and N columns.

* * * * *